US012675073B2

(12) United States Patent
Kuehl et al.

(10) Patent No.: US 12,675,073 B2
(45) Date of Patent: Jul. 7, 2026

(54) MINITURISED HOLOGRAPHIC DISPLAY

(71) Applicant: Carl Zeiss Jena GmbH, Jena (DE)

(72) Inventors: Siemen Kuehl, Jena (DE); Christoph Erler, Jena (DE); Petr Vojtisek, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 402 days.

(21) Appl. No.: 18/273,540

(22) PCT Filed: Jan. 14, 2022

(86) PCT No.: PCT/EP2022/050782
§ 371 (c)(1),
(2) Date: Jul. 20, 2023

(87) PCT Pub. No.: WO2022/157082
PCT Pub. Date: Jul. 28, 2022

(65) Prior Publication Data
US 2024/0085852 A1      Mar. 14, 2024

(30) Foreign Application Priority Data

Jan. 21, 2021    (DE) ......................... 102021200543.8

(51) Int. Cl.
*G03H 1/00*        (2006.01)
*B60K 35/10*       (2024.01)
(Continued)

(52) U.S. Cl.
CPC .............. *G03H 1/02* (2013.01); *B60K 35/10* (2024.01); *B60K 35/213* (2024.01); *B60K 35/22* (2024.01);
(Continued)

(58) Field of Classification Search
CPC ...... G03H 1/02; G03H 1/0005; G03H 1/2205; G03H 2001/2226; G02B 30/56; G02B 30/60; B60K 35/22; B60K 35/211
See application file for complete search history.

(56) References Cited

U.S. PATENT DOCUMENTS

| | | | |
|---|---|---|---|
| 8,749,371 B2 | 6/2014 | Moussa et al. | |
| 2017/0139096 A1 | 5/2017 | Frederiksen et al. | |
| (Continued) | | | |

FOREIGN PATENT DOCUMENTS

| | | |
|---|---|---|
| EP | 3647857 A1 | 5/2020 |
| GB | 2501754 A | 11/2013 |
| JP | H0939653 A | 2/1997 |

OTHER PUBLICATIONS

The International Search Report rendered by the International Searching Authority for PCT/EP2022/050782, dated May 13, 2022, 2 pages.

(Continued)

*Primary Examiner* — Ryan D Howard
(74) *Attorney, Agent, or Firm* — Skaar Ulbrich Macari, P.A.

(57) ABSTRACT

A holographic lighting apparatus includes at least two channels for the respective associated lighting functions. Each channel includes an edge-lit arrangement with an incoupling surface for coupling light from a light source into the arrangement, and an outcoupling surface; and a light source. The edge-lit arrangements of the channels are all included in a monolithic component having a common outcoupling surface, and each channel is arranged so as to be rotated about a surface normal of the outcoupling surface along an azimuthal arrangement angle. The component has at least one holographic structure for generating the lighting function of the relevant channel when said structure is illuminated by the light source of the channel. Also provided are (Continued)

a vehicle including a corresponding lighting apparatus, the use of the lighting apparatus as a display in a vehicle, and the lighting apparatus as an LED collimator.

21 Claims, 12 Drawing Sheets

(51) Int. Cl.

| | |
|---|---|
| *B60K 35/21* | (2024.01) |
| *B60K 35/22* | (2024.01) |
| *B60K 35/28* | (2024.01) |
| *G02B 30/56* | (2020.01) |
| *G03H 1/02* | (2006.01) |
| *G03H 1/22* | (2006.01) |
| *G03H 1/26* | (2006.01) |

(52) U.S. Cl.
CPC ........... *B60K 35/28* (2024.01); *G03H 1/0005* (2013.01); *G03H 1/2205* (2013.01); *G03H 1/265* (2013.01); *G03H 2001/2226* (2013.01);

*G03H 2001/2228* (2013.01); *G03H 2001/2271* (2013.01); *G03H 2222/34* (2013.01); *G03H 2223/24* (2013.01)

(56) References Cited

U.S. PATENT DOCUMENTS

| | | | |
|---|---|---|---|
| 2020/0201250 A1 | 6/2020 | Giehl et al. | |
| 2021/0318658 A1* | 10/2021 | Shirakura | ............... G09F 13/16 |

OTHER PUBLICATIONS

International Preliminary Report on Patentability rendered by the International Searching Authority for PCT/EP2022/050782, dated Jul. 20, 2023, 9 pages.

* cited by examiner

Potential stray light

Effectively used light

MINITURISED HOLOGRAPHIC DISPLAY

PRIORITY

This application claims the priority of German patent application DE 10 2021 200 543.8, filed Jan. 21, 2021, which is hereby incorporated herein by reference in its entirety.

FIELD

The invention relates to a holographic lighting device for producing at least two holographic lighting functions.

Furthermore, the invention relates to a vehicle having a corresponding lighting device and the use of the lighting device as a display in a vehicle. The use of the lighting device as an LED collimator is likewise encompassed.

BACKGROUND

In contrast with normal imaging, for example in photography, phase relationships of the light coming from the object are also stored in holography, in addition to the intensity of the imaged object. These phase relationships contain additional spatial information, whereby a three-dimensional impression of the image can be generated. This is effective with the aid of interference of light beams while the object is being recorded. The object is illuminated using coherent light, which is reflected and scattered by the object. The resulting wave field, which is known as object wave, is superposed on light coherent with the object wave (this is known as the reference wave—and typically comes from the same light source, for example a laser) and the wave fields interfere with one another as a function of their phase relationship. The resulting interference pattern is recorded using a light-sensitive layer, for example, and consequently the information contained in the phase is also stored. For reconstruction purposes, the resultant hologram is illuminated using a light wave which is identical or similar to the reference wave, and this light wave is subsequently diffracted by the recorded interference patterns. The original wavefront of the object wave can be reconstructed in this way. There are different types of holograms, for example transmission and reflection holograms which produce this reconstruction either in transmission or in reflection. For example, if situated on the opposite side of the hologram from the light source in the case of a transmission hologram and the latter is observed, then the imaged object appears three-dimensional in front of the observer.

In principle, holograms have been known to the public for some time, for example in the form of attention-grabbing product or packaging designs or as a security feature on credit cards and banknotes. Such holograms are usually not particularly impressive in terms of quality, since they are supposed to work even in incoherent daylight. The demands placed on holograms which are more impressive in terms of the plasticity of the objects represented are significantly more stringent in terms of spatial and temporal coherence with regard to the light sources used for recording and reproduction. This is often a barrier to the widespread use of holograms in everyday life, although holograms would be suitable for a wide range of applications on account of their strong visual and aesthetic impact. For example, the use of an approximately plane wave in the reconstruction is advantageous in the case of a multiplicity of holograms. A perfect collimation of a perfect point light source, which is desirable for this purpose, can often only be achieved approximately in reality, namely if a distance from a finitely extended light source is far enough for the latter to correspond approximately to a point light source. The demands placed on the distance between the light source and the hologram are made more stringent by the fact that a hologram surface to be illuminated should have a certain minimum size for many applications in the vicinity of an observer, and this minimum size must ultimately also be covered by the light beam used for reconstruction. These requirements often stand in the way of a compact structure of a holographic element. At the same time, however, a compact structure is desirable for a multiplicity of potential applications.

An exemplary application of holograms with such requirements can be found in vehicle or aircraft construction. Displays in this field should reproduce information which is as clear and as perceptible as possible, without the display of information becoming too abstract. This actually seems to be an optimal field of application for holographic displays, since holographic displays can also convey location information, and this for example may enable a more effective warning of obstacles. The driver's or pilots attention can also be increased by displaying a three-dimensional object, for example by a holographic warning display. An example of such a display, which seems particularly suitable for the use of a hologram, is what is known as a lane change assist system. The lane change assist system uses appropriate sensors to detect the presence of vehicles that are adjacent to the vehicle and could pose a hazard when changing lanes. In particular, vehicles in the so-called blind spot are detected by the sensor system. A warning to the driver can be output visually by an indicator light, located for example in the region of the outside mirror. In comparison with a conventional display, a holographic display would have the advantage that the warning effect of an object represented three-dimensionally by the display can be significantly more pronounced, thus increasing safety. In addition, the proximity of another vehicle can be understood more intuitively as a result of the spatial representation, whereby reaction times can be improved. An obstacle to the integration of such a holographic display system is that the available installation space in the vehicle is often very tight, and must be shared with other technical component parts. Little space is available in the region of the outside mirror in particular, since large-area component parts could obstruct the driver's field of vision.

The ability to present a plurality of different information items in spatially overlaid fashion, in particular, is also desirable in the case of a multiplicity of displays, especially in the case of a lane change assist system. For example, these different information items can be different warning levels of the lane change assist system, which depend on the actual risk of collision with the other vehicle.

Edge-lit holograms are holograms which are partly integrated in a transparent light-guiding body. They are preferably illuminated at a large angle. In this case, the hologram itself is located, for example, on an outer surface of the light-guiding body and the illumination is incident from one side of the light-guiding body, with the light being guided to the hologram between outer surfaces in the light guide. It is advantageous that, firstly, the light-guiding bodies can be designed to guide the light relatively interference-free even over relatively long distances and that, secondly, a desired alignment of the hologram with respect to the illumination within the scope of manufacturing tolerances is automatically ensured by the light-guiding body. The desired alignment has a significant effect on the quality of the holographic display and is therefore important. However, edge-lit holograms also require a larger installation space on account of the aforementioned requirements. Moreover, the ability to display different information items by a single edge-lit hologram is limited; for example, the ability to display different information items by illuminating a corresponding hologram from different angles is limited for geometric reasons when the illumination should be incident from different angles from the same side.

SUMMARY

Provided herein is a compact holographic lighting device which simultaneously enables high-quality holographic lighting functions, is able to implement more than one lighting function in the process, and is simple in design and easy to manufacture. It is also provided to use such a holographic lighting device to display information in a vehicle and increase safety in a simple and cost-effective manner, and to provide a vehicle comprising a corresponding holographic lighting device. Further provided is the use of the holographic lighting device as a simple, improved and cost-effective LED collimator in a metrological application or device.

Certain embodiments relate to a holographic lighting device for producing at least two holographic lighting functions, having at least two channels for the respectively assigned lighting function, with each channel comprising the edge-lit arrangement and light source component parts. An edge-lit arrangement in certain embodiments comprises an input coupling surface for coupling light from a light source into the arrangement and an output coupling surface. The light source is arranged for radiating into the input coupling surface. The edge-lit arrangements of the channels are encompassed in a monolithic component and the output coupling surface is a joint output coupling surface, wherein each channel is arranged (preferably rotated) about a surface normal of the output coupling surface along an azimuthal arrangement angle and wherein the monolithic component, in particular the output coupling surface, has at least one holographic structure predominantly parallel to the output coupling surface by preference and configured for producing the lighting function of the respective channel under illumination by the light source of the channel.

A typical embodiment will be presented in exemplary fashion hereinafter for introduction purposes. In this case, the monolithic component comprises two edge-lit arrangements (one for each channel), which face one another. These are illuminated crosswise by two light sources. In the process, each light source shines in the direction of the input coupling surface assigned thereto. Within the component, the light is guided to the joint output coupling surface, for example via a reflection on an outer surface of the component. The light in the two channels then is incident on the holographic structure on the output coupling surface from opposite azimuthal directions, with these azimuthal directions being preferably determined in the plane of the output coupling surface or holographic structure. The polar angles also preferably differ, with the polar angles preferably being measured in a plane perpendicular to the output coupling surface or holographic structure. The output coupling surface comprises a holographic structure for each channel, which generates a holographic display by output coupling the light of the respective channel. The channels can be well separated from each other on account of the different azimuthal and polar illumination directions. In this case, the holographic structures are insensitive to illumination from a direction other than the direction assigned to the channel and do not produce any lighting function in the process. For example, the lighting function may comprise two different warning levels of a lane change display, realized for example using different colors (red or yellow, red or green, or the like).

Separation of the channels advantageously means that the illumination of one channel only produces the lighting function of the corresponding channel and essentially no other lighting function of another channel.

The holographic lighting device for producing at least two holographic lighting functions is preferably suitable or configured for the production of at least two holographic lighting functions. This is preferably to be understood in a non-trivial manner, with a trivial interpretation being, for example, that the holographic lighting function is either switched on or off and this represents two lighting functions. A holographic lighting function preferably comprises a specific functionality that is able to be fulfilled by the hologram. For example, a holographic lighting function may be encompassed by the imaged object, the color of the image produced, the brightness of the image produced, the imaging direction of the image produced, and/or the imaging location of the image produced. The functionality can likewise consist of a beam shaping of light beams and/or a beam superposition of light beams from different light sources.

In this case, a holographic lighting function is in particular a lighting function produced by the holographic structure. The lighting function thus produced may appear to have, but need not appear to have, seemingly three-dimensional aspects, as are preferably produced by holograms. In this case, the lighting function produced may comprise an image in a plane or else have an image with an impression of depth. The holographic lighting function may comprise a virtual and/or real image. The holographic lighting function may have an image encompassed within the plane of the coupling-out structure (preferably referred to as an "in-plane" hologram) and/or have an image encompassed party or completely outside of the output coupling surface.

The at least two channels for the respectively assigned lighting function should preferably firstly be understood in the functional sense that each lighting function can be assigned a channel or vice versa, and this channel plays a role in the production or operation of the lighting function. Furthermore, a channel preferably comprises component parts that are essential for the production of the lighting function.

Each channel comprises the edge-lit arrangement and light source component parts. In particular, each channel comprises one edge-lit arrangement and one light source. Edge-lit arrangements have already been described above, preferably in terms of their principles.

For example, the light source may comprise at least one LED and/or at least one laser. The light source preferably emits light in the visible spectrum, in particular between 380 nanometers (nm) and 780 nm in relation to the wavelength of the light. The light sources of the channels can preferably be switched on and off independently of one another and have a corresponding separate electrical connection option for an electrical energy source.

The light source preferably does not comprise a separate beam-shaping component part, for example it does not comprise a lens.

However, it may also be preferable for the light source to comprise at least one beam-shaping component part, for example at least one lens.

The light source is preferably arranged with a chief radiation direction in the direction of the input coupling surface, especially if the light source has anisotropic emission properties.

The edge-lit arrangement preferably has a plurality of elements, which comprise an input coupling surface and an output coupling surface. The edge-lit arrangement preferably comprises a light-guiding element, in particular a light guide. The latter comprises at least one interface to the outside which closes off the light guide to the outside. This interface preferably comprises the input coupling surface and the output coupling surface. Preferably, there is not one interface but a plurality of individual interfaces with different orientations (e.g., given by the surface normal at a point of the respective interface), one of which comprising the input coupling surface and another one comprising the output coupling surface. The input coupling surface(s) and the output coupling surface are preferably located on different sides of the edge-lit arrangement.

The input coupling surface for coupling light from a light source into the arrangement is preferably suitable or configured for this purpose. This feature should preferably be understood as a structural feature, in the sense that light from the light source of the channel is also actually coupled into the edge-lit arrangement through this input coupling surface when the light source is switched on. The input coupling surface is preferably designed to this end, which is to say it is preferable for the said input coupling surface to be essentially transparent to the light from the light source and for the dimensioning, shaping and/or orientation in relation to the light source to have been made accordingly in order to couple into the edge-lit arrangement a quantity of light which has desired properties and is required for the lighting function of the channel.

The input coupling surface may comprise a flat surface, but it may preferably be curved for beam shaping.

The input coupling surface preferably has a surface normal at its (geometric) center of gravity, in particular a surface normal of a tangential plane of the input coupling surface through its center of gravity, which intersects the surface normal of the output coupling surface.

Preferably, all or some of the elements and component parts described herein are arranged in this manner.

The monolithic component preferably has the holographic structure.

In particular, the output coupling surface has the holographic structure.

However, the holographic structure may also be present in a plane within and/or at another interface of the component.

Light from the light source used to illuminate the holographic structure is preferably at least partly coupled out of the light-guiding body through the output coupling surface. In particular, the light which realizes the lighting function produced by the holographic structure under illumination is coupled out of the light-guiding body/component through the output coupling surface. The holographic structure is preferably configured to this end.

The light source is arranged for radiating into the input coupling surface. This preferably means that the light source is arranged opposite the input coupling surface and/or aligned in such a way that a chief ray direction of the light source points in the direction of the input coupling surface. The light source is preferably arranged opposite the input coupling surface in such a way that, for a given distance between the light source and the input coupling surface, an input-coupled intensity usable for the production of the lighting function is maximized.

A chief ray direction, for example of the light source, is preferably a direction in which there is a maximum intensity of the light beam or an intensity of the light beam averaged over all directions. The terms chief ray and chief ray direction preferably denotes the central ray of a beam and its direction, respectively. In this case, the direction of the chief ray indicates the direction of the beam in particular. In the case of a collimated beam, the remaining rays of the beam travel substantially parallel to the chief ray direction, and so the chief ray direction is preferably representative for the rays of a beam. In the case of a non-collimated beam, the rays of the beam enclose a defined solid angle, at the center of which the chief ray direction runs.

Preferably, at least 2 channels are encompassed. For example, 2, 3, 4, 5, 6, 7, 8, 9, 10, 11, 12, 13, 14, 15, 16, 17, 18, 19, 20, . . . , 25, . . . 30 channels or more may be encompassed.

The edge-lit arrangements of the channels are encompassed in a monolithic component. This preferably means that the edge-lit arrangements of the individual channels, which in particular are functional in terms of producing the lighting function assigned to the channel on their own, are integrated in a single monolithic component. In particular, this means that the monolithic component comprises the input coupling surface and the output coupling surface of each encompassed edge-lit arrangement. In this case, the output coupling surface is a joint output coupling surface, which is to say in particular that the output coupling surface of each edge-lit arrangement of the different channels is the same, joint output coupling surface.

In this case, monolithic preferably means consisting of one piece or in one piece. In this case, monolithic may in particular mean manufactured from one piece (e.g., the raw material of the light-guiding body).

The monolithic component preferably comprises the edge-lit arrangements, which, however, do not have any noticeable interfaces within the monolithic component at the points where they directly adjoin one another and, at those points, in particular are essentially transparent to the light of the light sources and/or have no changes in terms of their optical properties. In this case, the interfaces of the monolithic component to the outside are preferably formed by the interfaces of the edge-lit arrangements to the outside on the sides of the arrangements where these do not directly adjoin one another.

However, the monolithic component may preferably also comprise edge-lit arrangements which have interfaces within the monolithic component at the points where they directly adjoin one another, there being a change in optical properties, for example the reflectivity, at said interfaces.

In this case, the edge-lit arrangements are arranged relative to one another within the monolithic component in such a way that the individual output coupling surfaces of the edge-lit arrangements are overlaid and form a single output coupling surface, which is encompassed by an interface of the monolithic component to the outside.

The output coupling surface can preferably be a flat surface. However, it may also be preferable for the output coupling surface to be curved.

In this case, the surface normal of the output coupling surface is preferably a surface normal at the point where it touches or intersects the output coupling surface. In this case, it is in particular perpendicular to a tangential plane lying at this point.

The surface normal of the output coupling surface can preferably also be an intersecting straight line of the output coupling surface.

Preferably, the surface normal touches/intersects the output coupling surface at the (geometric) center of gravity of the output coupling surface.

Each edge-lit arrangement preferably comprises an input coupling surface, in particular a dedicated or separate input coupling surface.

Each channel is arranged about a surface normal of the output coupling surface along an azimuthal arrangement angle, preferably arranged rotated about the surface normal. The arrangement or alignment of the channel is preferably determined on the basis of an arrangement direction of the respective channel, this arrangement direction being defined in the same way for each encompassed channel so that the arrangement is defined uniformly for all channels. Preferably, this is in particular a chief ray direction of the light within the arrangement of each channel or a direction 180° opposite to the chief ray direction. In particular, this is a direction in which the component parts and/or elements of the channel/edge-lit arrangement are arranged or a direction 180° opposite to this direction.

The surface normal preferably runs on both sides of the output coupling surface, both outside the edge-lit arrangement or monolithic component and inside the edge-lit arrangement or monolithic component. It is clear to a person skilled in the art that, due to the requirement for each channel to be arranged rotated about the surface normal of the output coupling surface along an azimuthal arrangement angle, these channels are preferably arranged by definition about the surface normal within the edge-lit arrangement or monolithic component.

In this case, the azimuthal arrangement angle is defined in relation to the output coupling surface or, in the case of a curved output coupling surface, about a tangential plane at the point of intersection or point of contact of the surface normal of the output coupling surface with the output coupling surface. In this case, for specifying the angle, a reference direction can preferably be assumed as the direction from which the azimuthal arrangement angle is determined. This can be given, for example, by the azimuthal arrangement angle of a specific edge-lit arrangement. This reference direction then preferably corresponds to an azimuthal arrangement angle of 0°. The direction with respect to the reference direction, in which the azimuthal arrangement angle is measured, is preferably counterclockwise, but can likewise preferably be clockwise. Preferably, the absolute azimuthal angle is less critical to understanding the arrangement than the relative angle between the channels.

The monolithic component has at least one holographic structure configured for producing the lighting function of the respective channel under illumination by the light source of the channel. In this case, the at least one holographic structure is preferably realized and/or arranged in such a way that the holographic lighting function assigned to the channel is produced when the light source of the channel whose light at least partly illuminates the holographic structure is switched on. It is preferable for the holographic structure, in the case of illumination by a light source of another channel, to essentially not produce the holographic lighting function of the respective other channel or of its own channel, in particular for it not to produce any holographic lighting function at all. In this context, this may be a single holographic structure which contains the lighting function of the encompassed channels and is designed in such a way that, when the respective channel is illuminated (e.g., from the corresponding direction and/or with the corresponding spectral range), it produces the lighting function of the respective channel and preferably only produces the latter on account of being illuminated by the light source of the respective channel. However, this may preferably relate to a plurality of holographic structures, in particular at least one holographic structure per channel, which functions or is configured in accordance with the preceding explanations. Preferably, a plurality of channels may also produce a plurality of lighting functions simultaneously as a result of illumination by the light source of the respective channel.

The holographic structures assigned to the respective channels are preferably arranged one above the other, in particular stacked one above the other, in a so-called stack.

In an alternative example embodiment, the holographic structures assigned to the respective channels are present in a single holographic structure, in particular in what is known as a hologram film, in which they were jointly exposed. Such a holographic structure is preferably also referred to as a so-called multiplex hologram.

The output coupling surface preferably has the holographic structure.

However, it may also be preferable for the holographic structure to be arranged within the monolithic component or at another interface of the monolithic component. In this case, the holographic structure is arranged in particular in a plane parallel to the output coupling surface. If the holographic structure is accommodated on another interface of the monolithic component, the latter is preferably an interface that is parallel or opposite to the output coupling surface. It may be preferable for the plane in which the holographic structure extends to be a plane with substantially the same dimensions as the output coupling surface, in particular a plane that is superposed on or congruent with the output coupling surface.

The holographic structure is therefore preferably parallel to the output coupling surface. A person skilled in the art knows that parallelism may comprise not only straight planes but also curved planes which are parallel, which is to say in particular they are curved in the same way and do not intersect or would not intersect if they were arbitrarily enlarged, or only would intersect at infinity.

A person skilled in the art knows that parallelism may also mean that the holographic structure is present on the output coupling surface and encompassed by the latter.

Predominantly parallel preferably means that at least the tangential planes at the geometric center of gravity of the output coupling surface and of the holographic structure are parallel if at least one of the two surfaces of output coupling surface and arrangement plane of the holographic structure is a curved surface.

If the holographic structure is encompassed by the output coupling surface, then the holographic structure preferably extends over a majority (at least 50%) of the output coupling surface. It may be particularly preferred for the holographic structure to extend substantially over the entire output coupling surface.

Independently of the location of the arrangement of the holographic structure, the surface normal of the output coupling surface preferably likewise is a surface normal of the arrangement plane of the holographic structure. If this arrangement plane is curved, the surface normal is a surface normal of the tangential plane at the geometric center of gravity of the arrangement plane in particular. The wording that the holographic structure is parallel to the output coupling surface preferably means that the holographic structure is arranged perpendicular to the surface normal of the output coupling surface.

The holographic structure is preferably a transmissive holographic structure, especially if encompassed by the output coupling surface.

However, this may likewise be a reflective holographic structure, which can also be referred to synonymously as a reflecting holographic structure.

In a preferred example embodiment, the holographic lighting device is a holographic display. This preferably means that the holographic lighting device has a display function, for example for an above-described lane change assist system, in which at least two warning levels are encompassed, each of which being realized by a holographic lighting function. A warning or temperature display, preferably in a vehicle, for example of an operating element in a motor vehicle, can also be realized in this way.

This allows an extremely compact holographic lighting device to be realized, which is easy to manufacture and requires no adjustment. For example, different-colored holographic lighting functions can be produced in a single miniaturized holographic display.

As a further element, the edge-lit arrangement of each channel in a preferred example embodiment has a reflection surface which is configured for direct reflective illumination of the holographic structure with input-coupled light.

A reflection surface is preferably a surface encompassed by the edge-lit arrangement which is suitable for essentially reflecting the light rays from the light source. In particular, this means that it essentially reflects the rays at the respective angle of reflection and/or in the respective frequency spectrum. This can preferably mean a reflection of at least 50% of the light incident at the reflection surface, more preferably at least 60%, even more preferably at least 70%, and in particular at least 80%. Advantageously, the reflection essentially is specular reflection as opposed to diffuse reflection. However, in addition to the specular reflection, a certain degree of diffuse reflection may be desirable for a homogenization of the light. For example, the reflection surface may be an interface of the edge-lit arrangement to the outside. The reflection surface is thus preferably encompassed by the monolithic component. In this case, this may preferably be an interface to the outside of the monolithic component. However, the reflection surface might also be an interface of the edge-lit arrangement to the outside which is encompassed by the monolithic component but not an interface to the outside of the monolithic component, for example an interface between two edge-lit arrangements inside the monolithic component.

The reflection surface can preferably be a flat surface. However, this might also be a curved surface for the beam shaping of the input-coupled light. The reflection surface preferably has a surface normal at its center of gravity, in particular of a tangential plane of the reflection surface through its center of gravity, which intersects the surface normal of the output coupling surface.

Each edge-lit arrangement preferably comprises a reflection surface, in particular a dedicated or separate reflection surface.

The reflection can be based on a total-internal reflection on account of a change in the refractive index at the reflection surface from a higher to a lower refractive index and/or on account of the material properties of the reflection surface, which has a high reflectance for the frequency spectrum of the light source. By way of example, such a reflectance can be obtained by an appropriate coating, for example with a metal, in particular aluminum, silver, and/or gold.

The reflection surface is preferably configured for direct reflective illumination of the holographic structure by input-coupled light, which preferably means that this surface is arranged and/or designed in such a way that the majority of the light coupled into the edge-lit arrangement (preferably at least 50% of the input-coupled light of the channel), which is preferably input-coupled through the input coupling surface and in particular comprises a light from the light source of the channel, can reach this reflection surface, preferably directly from the input coupling surface to the reflection surface, and is reflected there in the aforementioned manner.

A direct reflective illumination of the holographic structure is preferably an illumination that illuminates the holographic structure essentially without further reflection or, if the holographic structure is a reflection hologram, with a maximum of one reflection at the output coupling surface.

The use of a reflection surface allows a particularly advantageous beam path to be obtained which, despite the compact design of the device, has a relatively long path within the device and thus can be shaped and controlled particularly well.

In a preferred example embodiment, the edge-lit arrangement of each channel has a reflection surface as a further element, which is configured for beam folding (preferably: once) of the illumination or the illumination light (preferably: the input-coupled light) of the holographic structure and for direct reflective illumination of the holographic structure by input-coupled light, with the illumination of the different channels on the holographic structure preferably essentially overlapping.

In a preferred example embodiment, the reflection surface is configured for direct reflective illumination of the holographic structure along the azimuthal arrangement angle, wherein the holographic structure is configured for producing the lighting function of the channel in the case of the reflective illumination along the azimuthal arrangement angle.

The reflection surface is configured in particular for direct reflective illumination of the holographic structure by input-coupled light along the azimuthal arrangement angle (preferably assigned to the channel). This preferably means the azimuthal arrangement angle of the edge-lit arrangement to which the reflection surface belongs. This advantageously results from the fact that the edge-lit arrangement is arranged along the azimuthal arrangement angle and hence the reflection surface is too.

Illumination along the azimuthal arrangement angle preferably denotes illumination with a chief ray direction which is parallel to or congruent with the azimuthal arrangement angle. The azimuthal arrangement angle is measured in particular from the surface normal of the output coupling surface and preferably indicates the orientation of the chief ray direction of the illumination coming from the reflection surface, as projected onto the output coupling surface or holographic structure. The chief ray direction of the direct reflective illumination or its projection onto the output coupling surface or holographic structure can point in the direction of the azimuthal arrangement angle or in the opposite direction. The convention of which illumination direction is considered to be along the azimuthal arrangement angle is preferably defined in such a way that an illumination along an azimuthal arrangement angle is caused by a reflection surface belonging to an edge-lit arrangement arranged along the azimuthal arrangement angle. Thus, two edge-lit arrangements arranged at 180° to one another preferably cause two illumination directions of the output coupling surface or holographic structure, which also differ by 180°.

By way of example, reflective illumination along the arrangement angle can be achieved by virtue of the reflection surface being arranged along a plane that is perpendicular to the azimuthal arrangement angle.

Thus, following the reflection at a reflection surface belonging to an edge-lit arrangement arranged along an azimuthal arrangement angle, the light advantageously has a chief ray direction with a projection onto the output coupling surface/the holographic structure along the azimuthal arrangement angle. The holographic structure located on the output coupling surface, for example, is thus illuminated with a chief ray direction along the horizontal arrangement angle. Thus, the respective holographic structure of each channel is advantageously illuminated from a different direction in relation to the azimuth angle with the output coupling surface or holographic structure.

The holographic structure is preferably configured for producing the lighting function of the channel in the case of the reflective illumination along the azimuthal arrangement angle. This preferably means that the holographic structure produces the lighting function in the case of an illumination with a chief ray direction along the azimuthal arrangement angle, in particular as described above.

In particular, the holographic structure is configured to produce the lighting function only in the case of an illumination along the azimuthal arrangement angle. This preferably means that the holographic structure produces essentially no lighting function in the case of an illumination along a direction other than along the azimuthal arrangement angle.

A person skilled in the art knows how to create corresponding holographic structures by illumination from appropriate directions when recording.

In this case, it may be preferable for the holographic structure to have a tolerance angle range around the azimuthal arrangement angle, in which the holographic structure likewise produces the desired lighting function. This is advantageous, in particular, since the illumination usually has a certain azimuthal angle spectrum around a chief ray direction. The tolerance angle range is preferably chosen in such a way that light from the respective channel, but essentially no light from another channel, is present in the tolerance angle range.

Terms such as "essentially", "approximately", "about", "approx.", etc., preferably describe a tolerance range of less than ±40%, preferably less than ±20%, particularly preferably less than ±10%, even more preferably less than ±5%, and in particular less than ±1%. Preferably, similar describes sizes that are approximately the same. Preferably, partly describes at least 5%, more preferably at least 10%, and in particular at least 20%, in some cases at least 40%.

On account of the angle-selective illumination and/or production of the lighting function, it is possible to implement an improved separation of the channels and the lighting function thereof in a very compact component, which has only a single output coupling surface and is designed monolithically. Different channels, their light sources, and/or lighting functions can, for example, be spectrally very close together or overlap (for example, there can be three channels with a respective lighting function in yellow, green and red, wherein these are in part spectrally close together or overlap, or there are three channels whose lighting functions are all in red). In this case, the holographic structures may possibly also be efficient for wavelengths of the respective other light source of the other channel. The preferred embodiment can prevent the light source of one channel from stimulating the holographic structure of the other channel to produce a lighting function.

In a further preferred example embodiment, the reflection surface is configured for direct reflective illumination of the output coupling surface or holographic structure by input-coupled light at a polar angle, preferably at a polar angle assigned to the channel, wherein the holographic structure preferably is configured for producing the lighting function in the case of an illumination at the polar angle, preferably at the polar angle of the channel.

In a manner analogous to an above-described reflection surface, which is configured for an illumination along an azimuthal arrangement angle, the reflection surface can be configured for an illumination of the output coupling surface or holographic structure at a vertical angle or polar angle assigned to the channel. Polar angle and vertical angle are preferably terms that can be used synonymously. For example, the polar angle can be denoted by the symbol $\Theta$.

As seen from the output coupling surface, the reflection surface is preferably arranged "above" the output coupling surface within the component. Above should preferably not be understood as an absolutely defined term, but as a term which describes the relative arrangement of various elements and component parts within the device. Considered like this, the output coupling surface should preferably be considered to be the underside of the device and the vertical direction in relation to the device is preferably defined along or parallel to the surface normal of the output coupling surface. In this case, the reflection surface is preferably inclined with respect to the vertical direction and preferably shaped in such a way that input-coupled light beams of the channel with a chief ray direction at a polar angle, assigned to the channel, in relation to the surface normal of the output coupling surface (or a parallel surface thereto) illuminate the output coupling surface or holographic structure. In this case, the polar angle is preferably measured counterclockwise, starting from the surface normal of the output coupling surface, as the angle between the chief ray direction of the illumination and the surface normal. In this context, measurements are always carried out in the direction in which the angle is smallest, with a positive or a negative angle being measured by convention depending on whether this direction is counterclockwise or clockwise. The convention can preferably also be such that measurements are carried out in a clockwise direction.

The determination of whether a measured angle is measured counterclockwise or clockwise is preferably dependent in this case on the viewing side of the plane in which the polar angle is located. However, this preferably likewise is merely by convention; what is more important is that for the chief ray direction of the illumination direction of two channels whose polar angles are in the same plane (this means that the two channels are opposite each other in particular) measurements are carried out using the same convention, which is to say in the same direction. This is preferably important for determining the polar angles of two opposing edge-lit arrangements, which preferably have an azimuthal arrangement angle which differs by substantially 180°. Thus, preferably two opposing channels with two opposing edge-lit arrangements illuminate the output coupling surface/the holographic structure along two azimuthal arrangement angles that differ by 180° and at two different polar angles. In the case of substantially the same structure of the two edge-lit arrangement, $\Theta_1 = -\Theta_2$ may apply to these angles.

The holographic structure preferably is configured for producing the lighting function in the case of an illumination at the polar angle of the channel.

In particular, the holographic structure is configured to produce the lighting function only in the case of an illumination at the polar angle of the channel. This preferably means that the holographic structure produces essentially no lighting function in the case of an illumination from a direction other than at the polar angle along the channel.

A person skilled in the art knows how to create corresponding holographic structures by illumination from appropriate directions when recording.

In this case, it may be preferable for the holographic structure to have a tolerance angle range around the polar angle, in which the holographic structure likewise produces the desired lighting function. This is advantageous, in particular, since the illumination usually has a certain polar angle spectrum around a chief ray direction. The tolerance angle range is preferably chosen in such a way that light from the respective channel, but essentially no light from another channel, is present in the tolerance angle range.

It may be preferable for each channel to have a different polar angle. Then, an improved separation of the channels is possible in that case. In particular, an improved separation of the channels is possible in conjunction with a separation of the channels by way of the illumination along different azimuthal arrangement angles.

It may be preferable for a plurality of channels to have the same polar angle, at least in terms of absolute value. However, at least two channels which are opposite in terms of the azimuthal arrangement angle and have the same polar angle in terms of absolute value preferably have a different polar angle (in terms of sign); see above. Otherwise, channels with the same polar illumination angle in terms of absolute value also differ, preferably in relation to the azimuthal illumination direction, and can therefore easily be separated from one another by a correspondingly selective holographic structure. In this way, an improved separation of the channels can be achieved, in particular for opposing channels.

It is clear to a person skilled in the art that only one of the two angles, or else both angles, may be decisive for the separation of the channels, depending on how the tolerance angle spectrum of the holographic structure is developed in relation to the illumination along the azimuthal arrangement angle or the illumination at the polar angle. It may be particularly preferable for an angle (preferably with a tolerance angle spectrum) for which the holographic structure fulfills the lighting function to be defined for each holographic structure in relation to the illumination of the azimuthal arrangement angle and for the illumination at the polar angle.

It is possible to simultaneously obtain a particularly good separation of the lighting functions of the channels and an ideal spatial arrangement of the channels by way of angle multiplexing along two "angular dimensions", whereby a high optical quality of the lighting function and small dimensions of the device can be achieved in the case of a plurality of channels.

The reflective illumination of the output coupling surface or the holographic structure is preferably implemented with a polar angle of between 40° and 60°, in particular 50°.

The reflective illumination of the output coupling surface is particularly preferably implemented at an angle greater than a critical angle for total internal reflection. The aforementioned angles preferably fulfill this condition.

In this case, the holographic structure preferably has a correspondingly adapted reconstruction angle, at which the lighting function is produced.

In particular, the hologram is reconstructed at smaller angles in relation to the surface normal (this preferably means that the output coupling surface or holographic structure is illuminated at small polar angles). As a result, installation space can preferably be saved in a lateral direction perpendicular to the surface normal of the output coupling surface.

In a further preferred example embodiment, the light source, the input coupling surface, and/or the reflection surface are configured for an illumination of the holographic structure with an angle spectrum in an azimuthal direction of less than 5°, in particular less than 2°.

An angle spectrum in an azimuthal direction means, in particular, the azimuthal angle spectrum, which is to say the angle spectrum in the plane (or projected onto the plane) in which the azimuthal angle is measured.

In a further preferred example embodiment, the light source, the input coupling surface, and/or the reflection surface are configured for an illumination of the holographic structure with an angle spectrum in a polar direction of less than 5°, in particular less than 2°.

The angle spectrum in the polar direction is preferably defined analogously to the angle spectrum in the azimuthal direction.

As a result, blurring of the hologram or ghost images in the reconstruction of the hologram can be reduced.

In a further preferred example embodiment, the light source, the input coupling surface, and/or the reflection surface are configured for an illumination of the holographic structure with an angle spectrum which deviates by less than 5°, in particular less than 2°, from a reference angle spectrum, with the reference angle spectrum preferably including an angle spectrum between 0° and 40°.

In this case, reference angle spectrum preferably denotes the angle spectrum of the reference wave during the production of the holographic structure.

A type of tolerance angle range of the holographic structure, within which a desired lighting function is produced by the holographic structure as a result of being illuminated, is preferably specified by the reference angle spectrum, which is used in the creation of the holographic structure (see above, "reference wave"). In this case, it may be preferable to have a relatively large tolerance range and accordingly have a relatively large reference angle spectrum, which is preferably closer to 40°, for example between 25° and 40°. This relaxes both the demands placed on the reference wave during the manufacture of the holographic structure and the demands placed on the angle spectrum of the illumination, and this in turn relaxes the demands placed on the accuracy of the manufacture of the monolithic component or the arrangement of the light source in relation to the component. This can make the production cheaper overall. However, it may also be preferable for this tolerance range, and hence the reference angle spectrum, to be rather small and hence closer to 0°, for example between 0° and 10°. The optical quality of the lighting function, in particular, can be improved in this way.

A maximum desired angle spectrum may depend in particular on the hologram motif or "depth" of the hologram. For example, if the image is located in the plane of the output coupling surface, then a larger angle spectrum is acceptable than if the image (or part of the image) for example appears far in front thereof or therebehind.

In this case, the chief radiation direction of the illumination preferably deviates by less than 3°, in particular less than 1°, from the chief radiation direction of the reference wave, or it is in particular congruent therewith or identical thereto. This improves the optical quality of the lighting function and the efficiency of the holographic lighting device because the illumination and the holographic structure are optimally matched to one another.

In a further preferred example embodiment, the holographic structure is configured for producing the lighting function of the channel in the case of an illumination with a spectral range corresponding to the light source of the channel. In other words, the spectral ranges of the channel and the holographic structure are preferably matched to one another. In this way, a particularly efficient illumination can preferably be obtained as one advantage.

In particular, at least two channels preferably have an illumination with a substantially different spectral range, with the holographic structure of the channel being configured for producing the lighting function only in the case of an illumination with a spectral range corresponding to the light source of the channel. A better separation can be achieved in this way, at least between the two channels. Different spectral ranges are often provided for the lighting function of two different channels, for example to enable displays of different colors. Advantageously, this can likewise be used to separate the channels. Synergistic separation effects can be achieved and the separation of the channels can be improved, especially in combination with a separation of the channels according to the illumination along the azimuthal arrangement angle and/or an illumination at a polar angle.

In a further preferred example embodiment, the output coupling surface has the holographic structure, wherein the holographic structure is a transmissive holographic structure, wherein the light source and edge-lit arrangement are configured for illumination of the output coupling surface at an angle greater than a critical angle of total-internal reflection.

A transmissive holographic structure comprises in particular a structure whose lighting function is realized when the holographic structure is viewed from one side under illumination from the other side, or which is configured to produce a corresponding lighting function. In particular, it is an at least partly light-transmissive structure whose holographic function was produced by illumination with an object wave and a reference wave from the same side of the structure. In particular, a transmissive holographic structure produces a lighting function that can be determined by looking at the output coupling surface.

It is preferable for the output coupling surface to be adjacent to air under standard conditions in the case of a normal use or application of the holographic lighting device and for a critical angle of the total-internal reflection to be able to be calculated accordingly if the refractive indices of, firstly, the monolithic component comprising the output coupling surface and, secondly, the adjacent air are known. A person skilled in the art knows how to calculate the critical angle and can design the device accordingly. In particular, the critical angle can be calculated using the equation $v_c = \arcsin(n_1/n_2)$ where $n_1$ denotes the refractive index of the optically denser medium, for example PMMA in this case, and $n_2$ denotes the refractive index of the optically thinner medium, for example air in this case.

Air under standard conditions refers in particular to air pursuant to ISO 2533, especially air at 288.15 Kelvin (K) or 15° C., an air pressure of 1013.25 hectopascals (hPa), and a relative humidity of 0 or dry air. However, a person skilled in the art can also assume the usual refractive index of approximately 1 for air and calculate the critical angle accordingly.

However, it may also be preferable for the output coupling surface to be adjacent to a material other than air. Then, too, a person skilled in the art knows how the critical angle of the total-internal reflection needs to be calculated on the basis of a change in the refractive index at the output coupling surface.

By illuminating the output coupling surface at an angle greater than a critical angle for total-internal reflection, it is possible in particular to suppress transmission or output coupling of the zeroth order from the output coupling surface. Advantageously, the zeroth order is undesirable as it comprises none of the information stored in the holographic structure and potentially dazzles the observer.

In particular, the light source and edge-lit arrangement are configured for illuminating the output coupling surface at an angle that is preferably at most 30° greater than the angle of total-internal reflection, in particular 10° greater. In the case of illumination at an angle greater than the critical angle, the zeroth order can advantageously be prevented from being output-coupled by the output coupling surface, as described above. At the same time, however, illuminating the holographic structure at an angle that is too large is preferably disadvantageous because the optical quality of holograms often suffers as a result.

Furthermore, in the case of "illumination that is too lateral", which is to say preferably at angles that are (too) large, the lateral extent of the monolithic component must be selected to be disadvantageously large since the oblique illumination of the preferably entire output coupling surface is otherwise difficult to achieve by way of the reflection surfaces.

In a further preferred example embodiment, a surface parallel to the output coupling surface has the holographic structure, wherein the holographic structure is a reflective holographic structure.

In this case, illumination can preferably be implemented in such a way that the illumination light comes directly from the reflection surface, or else the illumination light is initially incident on the output coupling surface at an angle greater than the critical angle of total-internal reflection and is reflected from there to the reflective holographic structure.

A spectral selection of the holographic structure, in particular, can be improved when using a reflective holographic structure, with the result that the holographic structure produces the lighting function for example only in a narrow spectral range. Thus, a better separation of the channels can be achieved if the light sources of the different channels have different spectra and/or if the conditions in relation to the spectral properties of the light source can be relaxed while the optical quality of the lighting function remains the same.

In particular, the light source and edge-lit arrangement are configured for illuminating the holographic structure parallel to the output coupling surface. The beam path can be adjusted accordingly so that the holographic structure parallel to the output coupling surface is illuminated rather than the output coupling surface. In relation to the edge-lit arrangement, this relates to the input coupling surface and/or the reflection surface in particular.

The light source and edge-lit arrangement are preferably configured for illuminating the holographic structure parallel to the output coupling surface at a polar angle greater than the critical angle of total-internal reflection. Since the zeroth order is thus advantageously reflected within the component, for example at an interface opposite the output coupling surface, and remains in the component, the zeroth order can advantageously be suppressed by this embodiment. Reflection at an interface opposite the output coupling surface can advantageously ensure that the zeroth order is also reflected at the output coupling surface, since the two surfaces are preferably substantially parallel.

It may likewise be preferable for the light source and edge-lit arrangement to be configured for illuminating the holographic structure parallel to the output coupling surface at a polar angle less than the critical angle of total-internal reflection. In this way, the zeroth order can advantageously be output-coupled at an interface opposite the output coupling surface and does not interfere with the light for producing the lighting function which was diffracted in the direction of the output coupling surface by the holographic structure.

In a further preferred example embodiment, the reflection surfaces are arranged in such a way that they at least partly form at least one lateral outer surface of the monolithic component. To the side or laterally preferably denotes an outer region/an interface to the outside (commonly called an "outer surface") of the holographic lighting device or monolithic component, which is not at the "bottom" or "top" (preferably see above definitions), where "top" or "upper side" preferably denotes an interface substantially opposite to the "bottom" or "underside" or denotes a substantially opposite region of the holographic lighting device or the monolithic component. If the reflection surfaces are "integrated" into the lateral outer surface in this way, then a "double function" of this lateral outer surface arises, on the one hand as an interface and on the other hand as a reflection surface. The device can thus be designed in a particularly compact and simple manner. Advantageously, the volume of the monolithic component can be optimally used for the beam paths of the input-coupled light. The beam paths can consequently be optimized for an improved lighting function with a compact design at the same time.

In a further preferred example embodiment, the input coupling surfaces are arranged in the direction of an interior of the monolithic component, wherein they preferably are arranged in such a way that they laterally enclose a partly open inner region of the monolithic component in at least one region. The input coupling surfaces are preferably located at the top. From these, the input-coupled light preferably reaches the output coupling surface or holographic structure via a reflection at the reflection surfaces. In this case, the input coupling surfaces can preferably be arranged toward the interior of the monolithic component, which means that, in particular, they are arranged at least partly in an opposite direction to the lateral outer surface lying closest thereto. In this case, the input coupling surfaces are preferably interfaces which represent an inwardly pointing transition from the edge-lit arrangement to an exterior. In particular, they have a surface normal, located outside of the arrangement, pointing into the interior of the device or in the direction of the surface normal of the output coupling surface. In this case, they need not have a complete vertical orientation, but may have an orientation at an angle to the vertical. The surface normal can also be a surface normal in a tangential plane of the input coupling surface if the input coupling surface does not comprise a straight plane but is curved. In this case, the tangential plane is present at a geometric center of gravity of the input coupling surface in particular. Such an arrangement of the input coupling surface renders it possible to arrange the light source assigned to the input coupling surface not outside of a lateral extent of the holographic lighting device, but within. Installation space can be saved in this way, especially in the lateral direction.

Preferably, the input coupling surfaces are arranged in such a way that they laterally enclose a partly open inner region of the monolithic component in at least one region. As a result, an upwardly open inner region of the monolithic component is formed at least on those sides which have an edge-lit arrangement including an input coupling surface.

Toward the bottom, this inner region can preferably be enclosed by an interface on which the holographic structure is present, insofar as the latter is not present on the output coupling surface.

In a further preferred example embodiment, the reflection surfaces are arranged in such a way that they at least partly form at least one lateral outer surface of the monolithic component and the input coupling surfaces are arranged in the direction of an interior of the monolithic component, wherein they preferably are arranged in such a way that they laterally enclose a partly open inner region of the monolithic component in at least one region. This embodiment permits a particularly advantageous beam path which enables good illumination of the output coupling surface while having a compact structure at the same time. In this case, light which is oriented in the direction of the lateral outer surface and reflected by the reflection surface encompassed by the lateral outer surface can be coupled into the arrangement by a light source arranged opposite the input coupling surface. In this case, the reflection surface is preferably tilted with respect to a vertical direction in such a way that the reflected light is directed at the lower output coupling surface or at the holographic structure. Thus, with an overall compact design of the device, relatively long beam paths can advantageously be realized since the beam is deflected inside the device by the reflection surface and the installation space is optimally used in the process.

It is particularly preferable for there to be a first and a second concentric circle around the surface normal of the output coupling surface, with the input coupling surfaces being touched by the first circle at a single point and the reflection surfaces being touched by the second circle at a single point, with the second circle in particular having a larger radius than the first circle. The two circles need not necessarily lie in the same plane, but at least are in mutually parallel planes which are perpendicular to the surface normal of the output coupling surface. Such an arrangement represents a particularly advantageous realization of the aforementioned embodiment, which is particularly compact and symmetrical and results in manufacturing advantages, among other things.

The reflection surface preferably has an angle of less than 20° with respect to the vertical direction. It may be preferable for the reflection surface not to have a flat surface. In that case the reflection surface preferably has a tangential plane, in particular through its geometric center of gravity, which has an angle of less than 20° with respect to the vertical direction. In particular, in combination with the embodiment in which the light source is arranged above an arrangement plane of the input coupling surfaces perpendicular to the surface normal of the output coupling surface and configured for radiating into the input coupling surface assigned thereto at an angle to the arrangement plane of the input coupling surfaces, a distance between the input coupling surface and the reflection surface can be kept small without clipping rays inside the component.

In at least one sectional plane orthogonal to the surface normal of the output coupling surface, each input coupling surface preferably has a first distance from the surface normal along the angle assigned to the channel, and the reflection surfaces have a second distance from the vertical axis. Preferably, the first distance is less than the second distance. This enables the provision of a beam-optimized device which is particularly well adapted to a given installation space.

In a further preferred example embodiment, the elements and component parts are each arranged along an arrangement plane of the respective elements or component parts that is perpendicular to the surface normal. The elements comprise in particular: the input coupling surface, the output coupling surface, the holographic structure, and/or the reflection surface. The component parts advantageously comprise the light sources and the edge-lit arrangement. In particular, the following arrangement is advantageous along a direction of the surface normal: first, the arrangement plane of the output coupling surface with the holographic structure, then the arrangement plane of the reflection surface, and subsequently the arrangement plane of the input coupling surface.

The following arrangement can also be advantageous (from bottom to top): first, the arrangement plane of the output coupling surface, then the arrangement plane of the reflection surface and the holographic structure, and subsequently the arrangement plane of the input coupling surface.

The light source can preferably be arranged in the plane of the input coupling surface or above this plane. The arrangement plane of the respective elements or component parts preferably intersects or touches the elements or component parts.

It is preferable for the channels to have three structure levels, which extend perpendicular to the surface normal of the output coupling surface:

a first structure level, which comprises or touches the output coupling surface, a second structure level, which comprises an intersection of the input coupling surfaces and the reflection surfaces, a third structure level, which comprises an arrangement plane of the light sources.

In a further preferred example embodiment, the edge-lit arrangements of the channels have a structure with substantially uniform dimensions. This preferably means that the individual edge-lit arrangements encompassed by the monolithic component each have the same dimensions. These dimensions relate in particular to the interfaces of the edge-lit arrangements to the outside, which consequently preferably substantially form the interfaces of the monolithic component to the outside. However, in addition to the interfaces to the outside, there may also be uniform dimensions with regard to the interfaces of the edge-lit arrangements within the component, which are merely "imagined" as a result of using the monolithic component or which play a role during construction. Substantially uniform dimensions advantageously comprise slight asymmetries, which are introduced for optical reasons (see below). The development and manufacturing costs can be reduced as a result of such a structure.

In a further preferred example embodiment, the channels are arranged predominantly rotationally symmetrically around the surface normal to the output coupling surface, with two channels with opposite arrangement in relation to the surface normal preferably being encompassed, with an angle between the arrangement angles of the channels being 180°, or with preferably four channels being encompassed, the angle between the arrangement angles of the channels being 90°.

A predominantly rotationally symmetrical arrangement comprises, in particular, an arrangement which can essentially be mapped onto itself by rotation about the surface normal at a specific angle. Slight deviations such as desired asymmetries for optical reasons (see below) or deviations in the light source (e.g., frequency spectrum or brightness) are preferably encompassed by the predominantly rotationally symmetrical arrangement. Such an arrangement is particularly advantageous in terms of design and can very well be mass-produced.

Two to five channels are encompassed, in particular two to four channels are encompassed, in a preferred example embodiment. In particular, exactly 4 channels are encompassed. As a result, it is possible to obtain a good compromise between the simplicity of production and the variability of the lighting functions to be produced.

In a further preferred example embodiment, two channels have an azimuthal deviation from one another from an opposing arrangement in relation to the surface normal of the output coupling surface, preferably by at least 1°. Inadvertent coupling into the other channel can thus be prevented or substantially prevented.

In this case, it may be particularly preferable for the deviation to be greater than a tolerance angle range of the holographic structure about the azimuthal arrangement angle. What can be achieved in this way is that, in the case of predominantly opposing arrangements, there is no illumination along the azimuthal arrangement angle from the two arrangements and the channels can be separated better.

Independently of a tolerance angle range, this likewise makes it possible to prevent a beam (e.g., the zeroth order beam) of a channel reflected by the output coupling surface from being reflected at the light source of the other channel and, from there, being coupled into the latter's input coupling surface and hence undesirably entering the other channel.

In a completely symmetrical arrangement, the light from one light source, which has passed through the component once, can again be incident on a light source from another channel (this would preferably be the 0th order of diffraction, while the 1st order is output-coupled). In the worst case, this may be coupled back into the component as a result of reflection at the light source and/or a switched-off LED may be excited, with the result that the lighting function of a switched-off channel would be produced.

In a furthermore advantageous example embodiment, the channels are constructed slightly asymmetrically so that the reconstruction angles of the holographic structures can differ as a result. Additionally, this can prevent light, which, for example, is output-coupled again from one light source through the input coupling surface via reflection within the optical part, from being incident on the other light source (analogously for the other channel).

In a further preferred example embodiment, two channels, preferably two opposing channels, have a deviation from one another by an absolute value of the polar angle, preferably between 1° and 10°. In this way, it is advantageously likewise possible to prevent light from one channel from reaching the other channel by reflection and from being able to stimulate a lighting function there.

The absolute value of the polar angles of both channels is preferably the same, for example if they are opposite one another and one angle is $\Theta_1$ and the other angle is $\Theta_2$, where $\Theta_1=-\Theta_2$. A small deviation from the fundamentally preferred, symmetrical structure can bring about a better separation of the channels.

For example, such an asymmetry would cause the output coupling surface or the holographic structure to be illuminated at different angles for each channel. To this end, the light source, the input coupling surface, and reflection surface must advantageously be at a slightly different angle to one another in comparison. Thus, firstly, unwanted reflections into the wrong channel would be advantageously prevented and a degree of freedom would be advantageously created for the reconstruction of the holograms at a slightly different angle in each channel.

However, it is advantageous if the deviation is not too large in order to obtain the compact design. Excessive variation would also mean that the required beam cross sections for illuminating the output coupling surface or the holographic structure would differ too much in terms of their installation space requirements. A difference in the absolute value of the polar angle is therefore preferably no more than 10°.

In a preferred example embodiment, the light source comprises at least one LED, in particular precisely one LED. LEDs are particularly simple, durable, and inexpensive and have sufficient optical properties, especially in relation to their coherence, with regard to a multiplicity of lighting functions, in particular holographic lighting functions. LEDs are particularly efficient.

LED emitters preferably have dimensions between 0.5× 0.5 mm 2 and 1×1 mm². In general, smaller emitter surfaces can always be said to be advantageous for this application. In this case, the minimum distance of the input coupling surface is independent of the emitter size (in contrast to the minimum distance of the reflection surface).

In a preferred example embodiment, the LEDs of different channels emit in a joint spectral range. In this way, different lighting functions which have a joint spectral range, in particular display functions of substantially the same color, can be produced.

In a further preferred example embodiment, the LEDs of different channels emit in different spectral ranges. In this way, particularly advantageous lighting functions of different colors can be realized, especially displays with different warning levels of different colors.

In a further preferred example embodiment, the emission spectrum of the LED can be assigned to one color. In particular, this means that the lighting function assigned to the LED (the channel thereof) is monochromatic.

In a further preferred example embodiment, the emission spectrum of the LED cannot be assigned to one color but comprises a multicolored spectrum. A multicolored lighting function, for example a white display, can be obtained for a channel in this way.

In particular, this is an RGB LED (RGB=Red/Green/ Blue) which comprises one or more emitters for R, G and B, which can preferably (in the case of a plurality of emitters) be controlled on an individual basis.

For example, this might be an Osram MULTILED LRTB GVSG, which emits at 625 nm (red), 528 nm (true green), 460 nm (blue). For example, intensities can be 500-1000 millicandela (mcd) for red, 1250-2010 mcd for green and 180-560 mcd for blue.

In a further preferred example embodiment, the light source, the input coupling surface, and/or the reflection surface are configured for an illumination of the holographic structure with defined light beams from the light source, which are matched to a reference wave used to record the holographic structure. Defined light beams preferably refer to precisely those light beams which are matched to the reference wave with regard to their properties. In particular, their properties are selected from the group comprising: (spatial and/or temporal) coherence, direction, chief radiation direction, angle spectrum and/or frequency spectrum. A person skilled in the art knows how to achieve this. Matching may in particular consist in the light beams having substantially the same properties as the reference light source. This allows a lighting function with particularly high quality to be obtained, for example a hologram with particularly high sharpness (depth of field).

The term chief radiation direction is preferably synonymous with the term chief ray direction.

In a further preferred example embodiment, the reflection surface is configured for an illumination of the holographic structure with defined light beams, with the reflection surface preferably being free-form or planar. In particular, the chief ray direction and/or the angle spectrum can be matched accordingly to the reference wave by means of a correspondingly designed reflection surface.

In a further preferred example embodiment, the light source, the input coupling surface, and/or the reflection surface are configured for a homogeneous illumination of the holographic structure. In this case, homogeneous means that, in particular, the holographic structure is illuminated with predominantly the same intensity over its entire surface. Preferably, a deviation in intensity over the holographic structure, in particular over substantially the entire holographic structure, is less than 20%, more preferably less than 10%, and in particular less than 5%. Preferably, a ratio of minimum intensity $I_{min}$ (or minimum illuminance or irradiance) to maximum intensity $I_{max}$ (or maximum illuminance or irradiance) is $I_{min}/I_{max}>0.8$.

In a further preferred example embodiment, the light source, the input coupling surface, and/or the reflection surface are configured for an inhomogeneous illumination of the holographic structure, preferably with a drop in intensity toward an edge region and/or central region of the holographic structure.

Intensity profiles within or through the holographic structure can be controlled, firstly, by varying the efficiency of the holographic structure. For example, there may be a variation from 100% (all light is output-coupled) to 50% (half of the light is output-coupled). In this case, however, a portion of the light which illuminates the holographic structure "is" not used because it is not output-coupled. Secondly, the light source, the input coupling surface, and, in particular, the reflection surface can be configured for an illumination of the holographic structure with an intensity profile.

For example, the holographic structure is already illuminated inhomogeneously (e.g., from 100% to 50% intensity) on account of a suitable shape of the reflection surface. In that case the holographic structure preferably has an efficiency of 100% throughout, which is to say all of the light is output-coupled (if the 0th order, for example, is ignored). With this embodiment, which is geared toward illumination with an intensity profile, a defined intensity profile can be demanded and, at the same time, the amount of output-coupled light or the efficiency can be maximized. At the same time, special lighting functions can be produced.

In a preferred example embodiment, the holographic structure is configured to produce a holographic lighting function with an intensity profile. Improved lighting functions can be provided, in particular in combination with an inhomogeneous illumination according to the aforementioned embodiment.

In a further preferred example embodiment, light sources, functional outer surfaces, and/or non-functional outer surfaces of the component are configured/arranged for predominantly illuminating the output coupling surface and/or the holographic structure without a prior reflection and/or trimming of input-coupled light beams by non-functional outer surfaces of the component. In this case, a reflection at the reflection surface in particular does not count as a reflection at a non-functional outer surface since the reflection surface is a functional outer surface. In particular, this means that the outer surfaces must be arranged and spaced apart from one another in such a way that an entire beam of a channel is guided substantially unhindered along an intended beam path to the output coupling surface and/or holographic structure. In particular, the light source, input coupling surface, reflection surface, holographic structure, and output coupling surface are arranged accordingly with respect to one another and/or have corresponding angles with respect to a vertical/to one another.

As an example, it is possible to consider a minimum distance between the light source and the input coupling surface; this is selected so as to reduce the input-coupled angle spectrum of the light and hence unwanted reflections in the component.

Such a minimum distance depends firstly on the size of the illuminated output coupling surface and/or holographic structure and the associated size of the reflection surface, and on the absolute position of the reflection surface. The input coupling surface should then be as far away from the LED as possible so that potential stray light is not coupled into the component. For example, there is a minimum distance of 8 mm between the light source and the input coupling surface in the case of a distance of at least 20 mm between the light source and the assigned reflection surface. At the same time, a preferably collimated, reflected light beam should not be trimmed by component edges.

In a further preferred example embodiment, the distance between the light source and the input coupling surface assigned thereto is at least 8 mm. In particular, undesired reflections on account of a too large input-coupled angle spectrum of the light source can be prevented in this way, with the light source preferably being approximated as a point light source.

In a further preferred example embodiment, the light source is arranged on the same side of the surface normal of the output coupling surface as the input coupling surface assigned thereto, preferably in the inner region of the monolithic component. This embodiment is particularly preferred if the light sources are housed in an inner region of the component. As a result, the overall height of the entire device can be reduced. The distance between the light source and the input coupling surface is preferably limited by virtue of a maximum distance being given by the distance between the input coupling surface and the surface normal of the output coupling surface.

It is particularly preferable for there to be a concentric circle around the surface normal of the output coupling surface, preferably a third concentric circle, on which the light sources are substantially arranged. The radius of the third circle is preferably smaller than the radius of the first circle and second circle. The three circles need not necessarily lie in the same plane, but at least are in mutually parallel planes which are perpendicular to the surface normal of the output coupling surface.

In a further preferred example embodiment, the light beams of the light sources of two opposite channels cross prior to the light being coupled into the respective input coupling surface.

In this case, crossing preferably means that the light beams preferably have opposite directions at least along one plane and, in particular, intersect at an angle in a sectional plane perpendicular to this plane. In particular, these opposite directions in at least one plane can be projections of the actual directions in this plane, with the intersection angle in the sectional plane not being equal to 0° or 180° in particular.

In a further preferred example embodiment, the light source is arranged on the opposite side of the surface normal of the output coupling surface as the input coupling surface assigned thereto, preferably outside of the inner region of the monolithic component, in particular along an edge region of the lateral outer surface of the monolithic component. The optical quality can be improved by a light source assigned to the respective input coupling surface and located on an opposite side of the input coupling surface, by virtue of this increasing a distance between the light source and the input coupling surface and between the light source and the reflection surface. In particular, a light source viewed from the input coupling surface and/or the reflection surface can be approximated as a point light source in this way, whereby a preferred collimation of the light from the light source can be improved by the input coupling surface and/or output coupling surface. Furthermore, the angle spectrum of the light coupled into the input coupling surface is preferably reduced by the large distance, and clean beam guidance without undesired reflections in the component is improved.

It is particularly preferable for there to be a concentric circle around the surface normal of the output coupling surface, preferably a fourth concentric circle, on which the light sources are substantially arranged. The radius of the fourth circle is preferably larger than the radius of the first circle. In particular, the radius of the fourth circle is similar to the radius of the second circle. In this context, similar preferably means that a deviation is less than 10%. The radius of the fourth circle can also substantially correspond to the radius of the second circle. In this embodiment, the light sources of a plurality of channels are not arranged in the vicinity of one another around the surface normal of the output coupling surface (or in the inner region), but instead are arranged in an outer region with an advantageously greater distance from one another. This allows even a multiplicity of light sources for a multiplicity of channels to be housed without spatially impeding one another. Consequently, cooling of the individual light sources is also better possible because they are spaced further apart and can therefore be better ventilated without heating one another. Electrical connections of the light sources to a controller and/or an electrical power supply are therefore also better possible, since the spatial requirements are not restricted so much by adjacent light sources.

In a preferred example embodiment, the light sources are arranged (preferably in a parallel plane to an arrangement plane of the input coupling surfaces) such that a distance to the assigned input coupling surfaces is maximized without increasing the dimensions of the holographic display in a direction perpendicular to the display axis. In particular, this means that the light sources are present arranged along a lateral edge region of the component, without projecting in the lateral direction beyond the dimensions specified by the lateral edge region. The lateral edge region of the component can preferably be formed at least in part by the reflection surfaces and preferably denotes the lateral outer surface of the monolithic component. In particular, the light sources are arranged along an edge region of the lateral outer surface. The edge region of the lateral outer surface preferably denotes its upper edge or the joint edge with a connecting surface between the input coupling surface and the output coupling surface. A variant of this embodiment is preferably the above-described arrangement of the light sources along the fourth concentric circle.

In a further preferred example embodiment, the light source is arranged above an arrangement plane of the input coupling surfaces which is perpendicular to the surface normal of the output coupling surface, and preferably configured for radiating into the input coupling surface assigned thereto, at an angle with respect to the arrangement plane of the input coupling surfaces. The angle is preferably chosen in such a way that the chief radiation direction of the light source is optimized in relation to the input coupling surface assigned thereto. The arrangement plane of the input coupling surface is preferably synonymous with the second structure level.

In this embodiment, the distance between the light source and the input coupling surface assigned thereto and/or the reflection surface assigned thereto can preferably be chosen to be large, without greatly increasing the installation space required for the device. In particular, the lateral extent of the device is substantially not changed as a result. Only in the vertical direction does the space requirement increase somewhat since the light sources are arranged above the arrangement plane of the input coupling surfaces. In this case, however, this vertical distance between the light sources and the arrangement plane of the output coupling surfaces is advantageously chosen to be as small as possible.

The light sources of this embodiment are preferably arranged at a tilt angle, so to speak, about an axis perpendicular to the display axis, in the direction of the input coupling surface assigned thereto.

The illumination of the individual channels realized in this way before coupling into the component is implemented crosswise, so to speak, especially in the case of opposite edge-lit arrangements. Despite the beam path being optimized in relation to the optical quality of the illumination and the lighting function resulting therefrom, installation space can be saved by means of these arrangements.

In a further preferred example embodiment, the reflection surface comprises a parabolic mirror, the focal plane of which preferably coincides with an emitter surface of the light source, wherein the emitter surface of the light source preferably has an extent of up to 1×1 mm², and the light source and the assigned reflection surface have a distance of at least 20 mm.

A parabolic mirror is preferably a concave mirror which has the shape of a paraboloid of revolution. A parabola is preferably a set of all the points whose distance from a fixed point, the focal point, is equal to that from a specific straight line, the directrix. The parabola is preferably turned into the paraboloid of revolution by rotation about its axis of symmetry, with this comprising a reflective surface in the case of the parabolic mirror.

The parabolic mirror advantageously reflects a perpendicularly incident beam (a beam parallel to the axis of symmetry) toward the focal point, and vice versa. The parabolic mirror can also be a spherical concave mirror which has essentially similar optical properties close to the axis of symmetry and which can be manufactured more cost-effectively.

Such a reflection surface is preferably suitable for steering the light from the light source as a collimated beam to the output coupling surface and/or the holographic structure. Collimation is preferably brought about in all directions perpendicular to the chief ray direction. In this way, the output coupling surface can be illuminated with a ray or a beam with a small angle spectrum and the optical quality of the lighting function can be increased.

The terms ray and beam can preferably be used synonymously in this document. A beam is preferably understood as meaning a plurality of rays which run substantially parallel to one another. The term "beam" in this document can preferably comprise both a single ray and a beam.

In this case, the light source can preferably be approximated as a point light source, whereby the collimation is improved, since the collimation of a beam is best when the deviation of the beam origin from the focal point is as small as possible.

In this case, it is preferable for the light source and the assigned reflection surface to be spaced apart by distance that is configured so that the light source can be approximated by a point light source.

Such an approximation is justified, in particular, if the emitter surface of the light source has an extent of up to 1×1 mm² and the light source and the assigned reflection surface have a distance of at least 20 mm. Then, the collimation of the input-coupled beam of the light source can be further improved.

In a preferred example embodiment, a ratio of the distance between the light source and the input coupling surface assigned thereto to the distance between the light source and the reflection surface assigned thereto is 0.4 to 0.85.

It was discovered that a clean beam path without undesired reflections in the component can be achieved in this way and, as it were, the reflection surface can be well illuminated. A particularly good collimation can be achieved with this distance ratio, especially if the reflection surface is suitable for beam shaping, for example by way of the reflection surface being in the form of a parabolic mirror.

In a preferred example embodiment, the dimensions of the device are smaller than 80 mm×50 mm×50 mm, in particular smaller than 30 mm×40 mm×30 mm. Devices with these dimensions have proven to be particularly practical for a multiplicity of applications in which a limited installation space is available for the device, and at the same time make it possible to realize lighting functions with high optical quality.

In a further preferred example embodiment, the holographic structure is configured for producing an identical image for each channel, wherein the lighting function corresponds to an adjustable brightness of the image.

Identical image preferably denotes both the motif of the image, the colored representation/the frequency spectrum of the image and also the location of the image, which is identical (the identical images of the channels are preferably spatially overlaid). The image is a holographic image representation in particular. If a plurality of channels produce the same image, the adjustable brightness can be implemented, in particular, by virtue of 1. light sources with different brightnesses being used in different channels
2. the number of simultaneously switched on channels producing the identical image being varied.

The brightness can be implemented in particular by a combination of 1 and 2. This type of brightness control is made possible by the device, in particular by virtue of the optical quality of the produced image being so good that a plurality of images can be imperceptibly overlaid for the purpose of controlling the brightness. In this way, an improved and particularly simple closed-loop control of the brightness of an (in particular holographic) image can be achieved.

In a further preferred example embodiment, the holographic structure is configured for a beam shaping of light beams of the channel, wherein the beam shaping is preferably selected from the group of collimation, focusing and/or divergence.

In this way, the light beams of a plurality of LEDs can be combined in a single light beam, which is shaped according to the beam shaping, or can be added on an individual basis. In this way, different functionalities can be fulfilled, for example the illumination of a sample using light of different spectra (light of different channels).

The result is advantageously a homogeneously illuminated surface, the output coupling surface and/or the holographic structure, which emits beam-shaped light, for example collimated light (with conventional prior art solutions there is either one or the other). It would also be advantageous for a plurality of light sources, for example a plurality of LEDs, to be able to be coupled into the system. Such systems could be used in metrology, among other things.

A corresponding holographic structure can be produced, for example with the aim of collimation, by virtue of recording the holographic structure with two plane waves. Thus, for a given reconstruction setup, a plane wave is preferably reconstructed or output-coupled again.

In this case, a homogeneity of the output-coupled beam can preferably be controlled via the efficiency of the respective holographic structure. This creates great flexibility within the scope of beam shaping.

In a further preferred example embodiment, the input coupling surface has a rounded area on the outer edges, which is preferably configured for suppression of undesired total-internal reflections at non-functional outer surfaces of the component, with a rounding radius being between 0.5 millimeters (mm) and 2 mm, in particular.

Since the input coupling surface and reflection surface are spaced apart, the upper side or (top) connecting surface between the input coupling surface and the reflection surface also has a finite extent d, at which rays can be the subject to total-internal reflection. Rounded areas can preferably be introduced on the outer edges of the input coupling surface in order to shade the aforementioned rays or scatter them in a targeted manner. In this case, the size is preferably dependent on the trimming of the upper side and the size of d (e.g., the smaller d the smaller the stray light). Radii of the order of 0.5 mm are typically somewhat more complex to manufacture than larger radii of the order of 2 mm. However, this depends in particular on the position of the rounded area on/in the component and/or the milling tool used.

In a further preferred example embodiment, the connecting surface between the input coupling surface and the reflection surface is tilted for a suppression of undesired total-internal reflections at non-functional outer surfaces of the component.

It is preferable for the connecting surface between the input coupling surface and the reflection surface to normally represent a straight connection between the upper edges of the input coupling surface and the reflection surface, with these upper edges preferably being arranged for an unhindered course of a substantial or predominant proportion of the input-coupled beams, or for input coupling of beams along a desired direction. Nevertheless, undesirably, beams can be subject to total-internal reflection at the connecting surface, in particular due to beam deflections at the outer edges of the input coupling surface. A slightly tilted connecting surface, so that the upper edge at which the connecting surface meets the reflection surface is somewhat higher than in the normal case described above, can reduce such undesired total-internal reflection. Such a tilted connecting surface is suitable in particular as an alternative or supplement to the aforementioned rounded areas.

In this case, the rounded areas can also be explained for manufacturing reasons, for example to produce the component by way of a milling process. In this case, rounded areas generally are often desired (e.g., to make optimal use of the geometry of the milling cutter or to tolerate wear during the molding process). It may therefore be preferable to round the edges of an object so as to ensure reproducible parts suitable for series production. Thus, both an optical and a manufacturing-related advantage can be achieved as a result of the rounding.

In a preferred example embodiment, the monolithic component contains an optical plastic suitable for injection molding.

In a particularly preferred example embodiment, the monolithic component contains a material selected from the group consisting of polymethylmethacrylate (PMMA), polycarbonate, cycloolefin polymer (COP) and/or cycloolefin copolymers (COC).

In a preferred example embodiment, the monolithic component contains at least one glass with a low transition temperature (so-called low Tg glass), which is particularly suitable for glass molding or precision glass molding.

In particular, the monolithic component contains a material selected from the group of borosilicate glass, B270, N-BK7, N-SF2, P-SF68, P-SK57Q1, P-SK58A, and/or P-BK7.

These materials are particularly easy to process, well suited for mass production, cost-effective, and/or have particularly good optical properties.

In a further preferred example embodiment, the monolithic component is shaped ready for production and/or has no undercuts.

In a further preferred example embodiment, the monolithic component is shaped ready for production, and/or has draft angles and/or rounded areas.

In a further preferred example embodiment, the monolithic component is shaped ready for production, and/or has draft angles and/or rounded areas, but no undercuts.

Undercut is preferably synonymous with undercutting. For example, an undercut denotes a structural element that protrudes freely and thus for example can prevent a cast part from being able to be removed from its mold. The avoidance of an undercut is therefore particularly advantageous for simple and cost-effective mass production.

A draft angle preferably refers to the minimum required deviation from a perpendicular for mold separation. Common sizes for the necessary drafts are known to a person skilled in the art.

A rounded area refers in particular to a rounded area of a component edge. As mentioned above, rounded areas with a radius of the order of or greater than 2 mm, in particular, can be realized particularly cost-effectively in mass production.

Therefore, rounded areas and draft angles and dispensing with undercuts can make production cheaper.

A further preferred example embodiment comprises stops which are preferably configured to prevent unwanted light beams from radiating in and/or to prevent crosstalk/suppression of the radiation into adjacent channels.

These are arranged, for example, in such a way that the light emitted by an LED assigned to a channel can only radiate into the respectively assigned input coupling surface in order to prevent crosstalk into adjacent channels or coupling into areas that are not intended for this purpose.

In this way, crosstalk between the channels can be prevented and the separation of the channels can be improved.

In a further preferred example embodiment, a chief direction of light beams coupled out from the output coupling surface encloses an angle of +30° to −30° in a plane with a surface normal of the output coupling surface or a solid angle around the surface normal of the output coupling surface of approximately 0.2141 steradian.

In this way, lighting functions that are visible to a user can be produced particularly well.

In a further aspect, the invention can relate to a monolithic device comprising edge-lit arrangements for a holographic display as described above.

The advantages, definitions, and embodiments of the holographic lighting device according to the invention likewise apply to the claimed monolithic component according to the invention.

In a further aspect, the invention can relate to a vehicle comprising at least one holographic lighting device according to the above description, wherein the holographic lighting device is configured to display at least one of a plurality of possible information items relating to a driving situation, wherein one information item is assigned to a channel of the device, wherein the holographic lighting device is preferably arranged in an A pillar, a B pillar and/or a C pillar of the vehicle, and wherein the holographic lighting device comprises a display of a lane change assist system in particular.

The holographic lighting device can also be present at a different location, in particular in the interior of the vehicle.

In this case, the relevant driving situations for a display of a lane change assist system comprise in particular information relating to further objects, in particular vehicles, which are in the surround of the vehicle and which, in particular, are relevant to driving safety when the vehicle changes lanes. An example may include a detected presence of a vehicle in a blind spot of the vehicle's outside mirror. In this context, the plurality of possible information items may comprise, for example, an indication of the danger of a situation, which arises, for example, from the proximity of another vehicle. For example, the display may comprise a hologram of a symbolic vehicle or a warning triangle of different sizes and/or colors, depending on the level of danger. By way of example, the color can transition from green to yellow and to orange and to red as the danger increases. Alternatively, the displayed symbolic vehicle becomes larger and larger or closer to the driver as the distance from another vehicle decreases. Such different lighting functions can advantageously be realized by the holographic lighting device, which at the same time can be housed within a vehicle, in particular in an A, B or C pillar, on account of its compactness.

The advantages, definitions, and embodiments of the device according to the invention likewise apply to the claimed vehicle according to the invention.

In a further aspect, the invention can relate to the use of a holographic lighting device according to the above description for displaying at least one of a plurality of possible information items, in particular in a vehicle in relation to a driving situation, wherein the information is assigned to a channel of the device and wherein, for the purpose of displaying the information, the holographic structure is illuminated by the light source assigned to the channel.

The advantages, definitions, and embodiments of the device according to the invention likewise apply to the claimed use, according to the invention, of the device.

In a further aspect, the invention can relate to the use of a holographic lighting device according to the above description for displaying at least one of a plurality of possible information items for an operating element, in particular in a vehicle, wherein the information is assigned to a channel of the device and wherein, for the purpose of displaying the information, the holographic structure is illuminated by the light source assigned to the channel.

The advantages, definitions, and embodiments of the device according to the invention likewise apply to the claimed use, according to the invention, of the device.

The operating element in certain embodiments may comprise, for example, a display bar which for example indicates the selected or actual temperature in a vehicle, for example in blue at lower temperatures, for example below 20°, and red at higher temperatures. The temperature can be displayed over an adequate range, for example from 14-28° in 0.5° steps. A holographic light for indicating that the hazard warning lights are switched on or for changing symbols, for example in relation to the air-conditioning, can also be realized by a single lighting device. It may likewise be preferable for the different channels of the lighting device to be used to produce, by way of the lighting device, symbols which remain unchanged but have different colors.

A switch with changing functionalities, which can each be displayed by the lighting device for information purposes, can also be realized in this way.

For example, the switch can be realized as a pressure switch in combination with a lighting function produced within the output coupling surface.

In the process, special representation options advantageously arise by way of the 3-D representations possible as a result of the holographic structure.

In a further aspect, the invention can relate to the use of a holographic lighting device according to the above description as an LED collimator, in particular for a metrological application and/or device.

The advantages, definitions, and embodiments of the device according to the invention likewise apply to the claimed use, according to the invention, of the device.

In this way, in particular, a telecentric, homogeneous illumination can be realized, as is used, for example, in the silhouette method.

The invention will be explained below with reference to further figures and examples. The examples and figures serve for illustrating a preferred embodiment of the invention without limiting the latter.

BRIEF DESCRIPTION OF THE DRAWINGS

FIG. 1 shows a perspective view of a first embodiment of the device with two channels and light sources arranged in the inner region of the component.

FIG. 2 shows a cross-sectional view of the first embodiment with two channels, with a first channel switched on.

FIG. 3 shows a cross-sectional view of the first embodiment with two channels, with a second channel switched on.

FIG. 7 shows a perspective view of a second embodiment of the device with two channels and light sources which are above the arrangement plane of the input coupling surfaces and arranged along an edge region of the lateral outer surface of the device.

FIG. 8 shows a cross-sectional view of the second embodiment with two channels, with a first channel switched on.

FIG. 9 shows a cross-sectional view of the second embodiment with two channels, with a second channel switched on.

FIG. 10 shows a second perspective view of the second embodiment of the device with two channels.

FIG. 11 shows a cross-sectional view of the second embodiment with both channels switched on.

DETAILED DESCRIPTION

Figures 1, 2, 3:
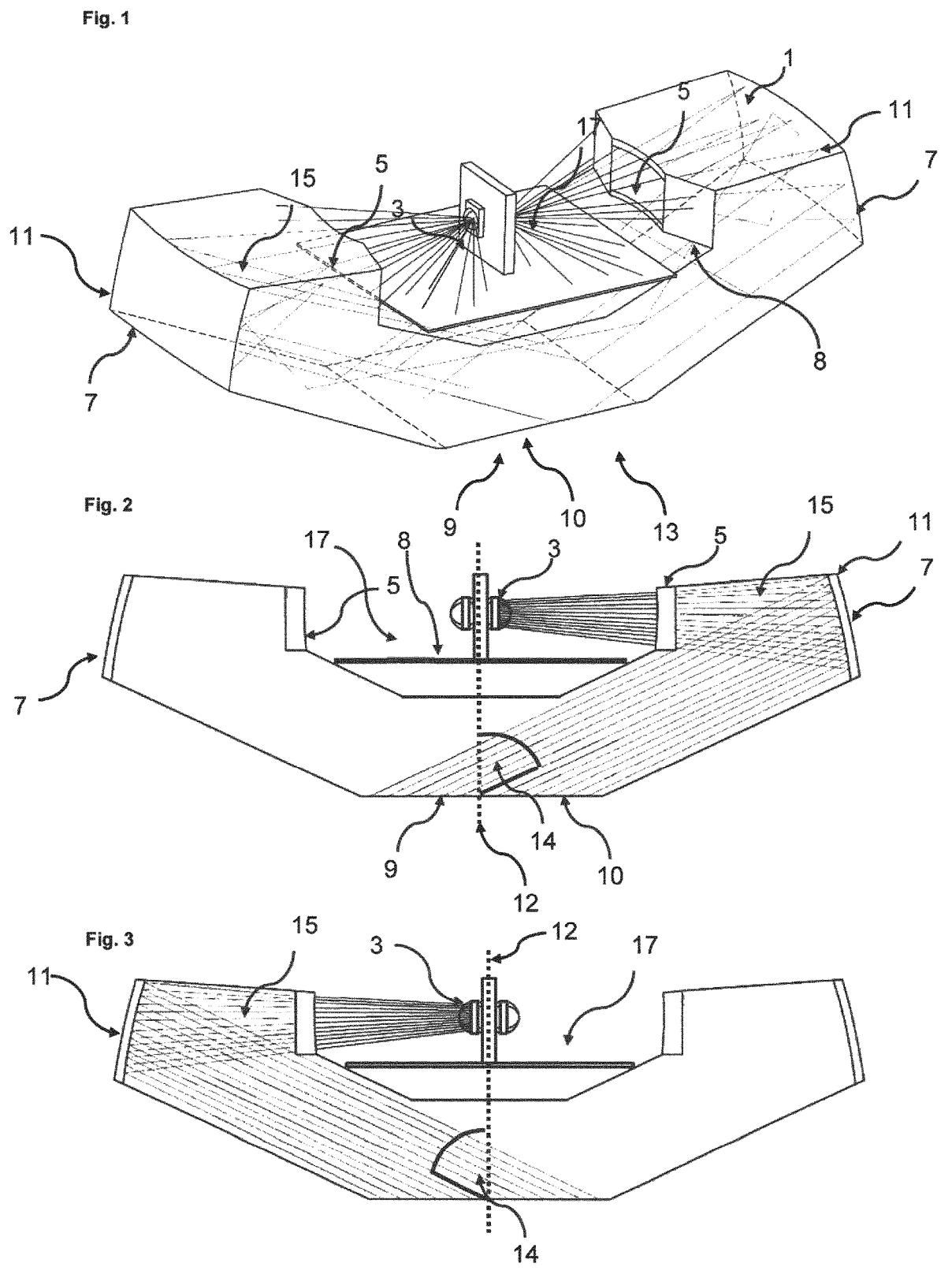
Figure 4:
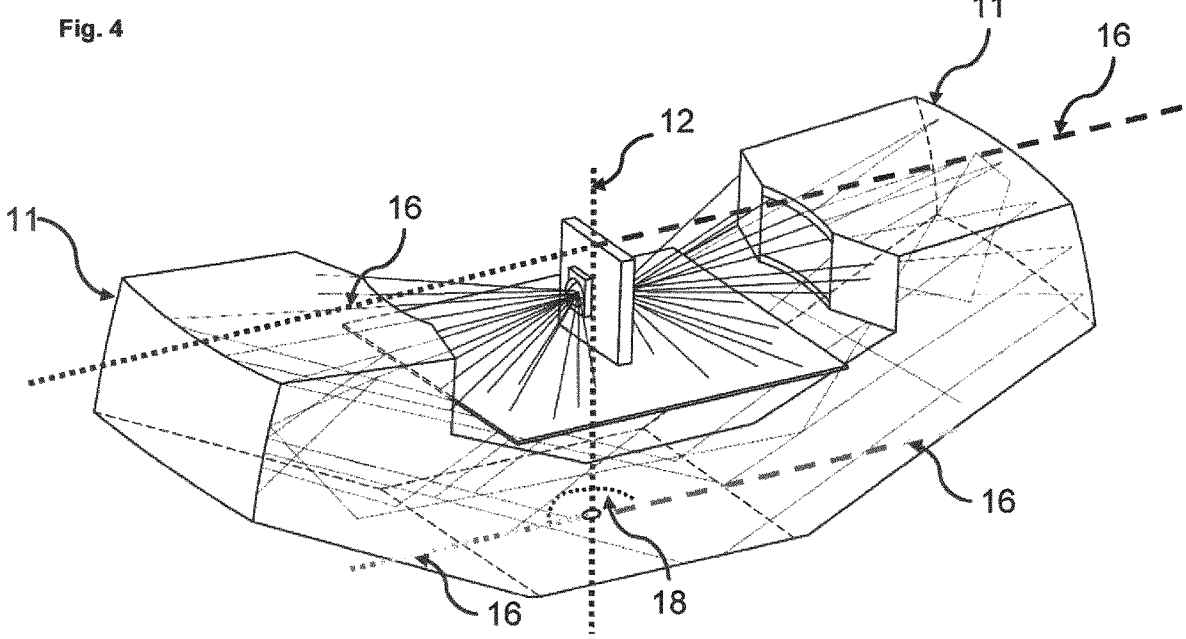
FIG. 4 shows a perspective view of the first embodiment for the purpose of representing the azimuthal arrangement angle.

FIG. 1 shows a perspective view of a first embodiment of the holographic lighting device 1 with two channels and light sources 3 arranged in the inner region of the component 17. The light of each light source 3 is input-coupled via the input coupling surface 5 assigned thereto, the input-coupled light beams 15 are then reflected at the reflection surface 7. The reflected light beams bring about the direct reflective illumination of the output coupling surface 9, present on which is the holographic structure 10 of each channel which, when illuminated by the light source of the channel, produces the holographic lighting function. An edge-lit arrangement 11 comprises an input coupling surface 5, preferably a reflection surface 7, and an output coupling surface 9, on which the holographic structure 10 may be present. In this case, a channel comprises an edge-lit arrangement 11 and a light source 3. In the exemplary embodiment shown, two opposing edge-lit arrangements 11 are encompassed by a monolithic component 15 and the output coupling surface 9 of both edge-lit arrangements 11 is a joint output coupling surface 9. The edge-lit arrangements 11 are two opposing edge-lit arrangements 11 whose azimuthal arrangement angle with respect to a surface normal of the output coupling surface (not shown) differs by 180°. FIG. 1 likewise shows a stop 8 which is arranged on a side surface next to the input coupling surface 5 and is intended to minimize irradiation of the component 13 by undesired light beams.

FIG. 2 shows a cross-sectional view of the first embodiment with two channels, with a first channel switched on. The switched-on channel is realized by way of the edge-lit arrangement 11 on the right in the view shown and by way of the right light source 3 in the inner region of the component 17. This light source 3 is switched on. The light beams 15 input-coupled via the right input coupling surface 5 are reflected by the reflection surface 7. The direct reflective illumination of the output coupling surface 9 and hence also of the holographic structure 10 in this example is implemented at or under a polar angle 14 with respect to the surface normal of the output coupling surface 12. The holographic structure 10 is configured for producing the holographic lighting function in the case of an illumination at the polar angle (and preferably at substantially no other polar angle). In the exemplary embodiment shown, the polar angle 14 is counted counterclockwise starting from the surface normal of the output coupling surface and is therefore −Θ. Another stop element 8 is shown in FIG. 2 and this prevents light radiated "downward" from the light source 3 from being coupled into the component 13.

FIG. 3 shows a cross-sectional view of the first embodiment with two channels, with a second channel switched on. The second switched-on channel corresponds to the left edge-lit arrangement 11 and the left light source 3 in the view shown. When the left channel is switched on, the output coupling surface 9, and hence the assigned holographic structure 10, is directly reflectively illuminated at the polar angle 14 with respect to the surface normal of the output coupling surface 12. The polar angle 14 is still read positive counterclockwise and is thus +Θ. The holographic structure 10 of the switched-on channel is configured for producing the holographic lighting function at this polar angle 14 (and preferably at substantially no other polar angle 14).

Thus, lighting functions for the respective channel are preferably only produced if the light source 3 of the respective channel is switched on and the holographic structure assigned to the channel is illuminated at the polar angle 14 with respect to the surface normal of the output coupling surface 12. In this way, lighting functions of the two opposing channels can be separated very well with the two opposing edge-lit arrangements 11.

FIG. 4 shows a perspective view of the first embodiment for the purpose of representing the azimuthal arrangement angle 18. The right channel with the right light source and the right edge-lit arrangement 11 is arranged in a first azimuthal arrangement direction 16 at a first azimuthal arrangement angle 16 about the surface normal of the output coupling surface 12. In the example shown, this is assumed to be 0° (not shown). The second, opposite, left edge-lit arrangement 11 is arranged in a second azimuthal arrangement direction 16 at a second azimuthal arrangement angle 18 about the surface normal of the output coupling surface 12. According to the angle definition made, this azimuthal arrangement angle 18, which can preferably be read counterclockwise, is 180°.

Figure 5:
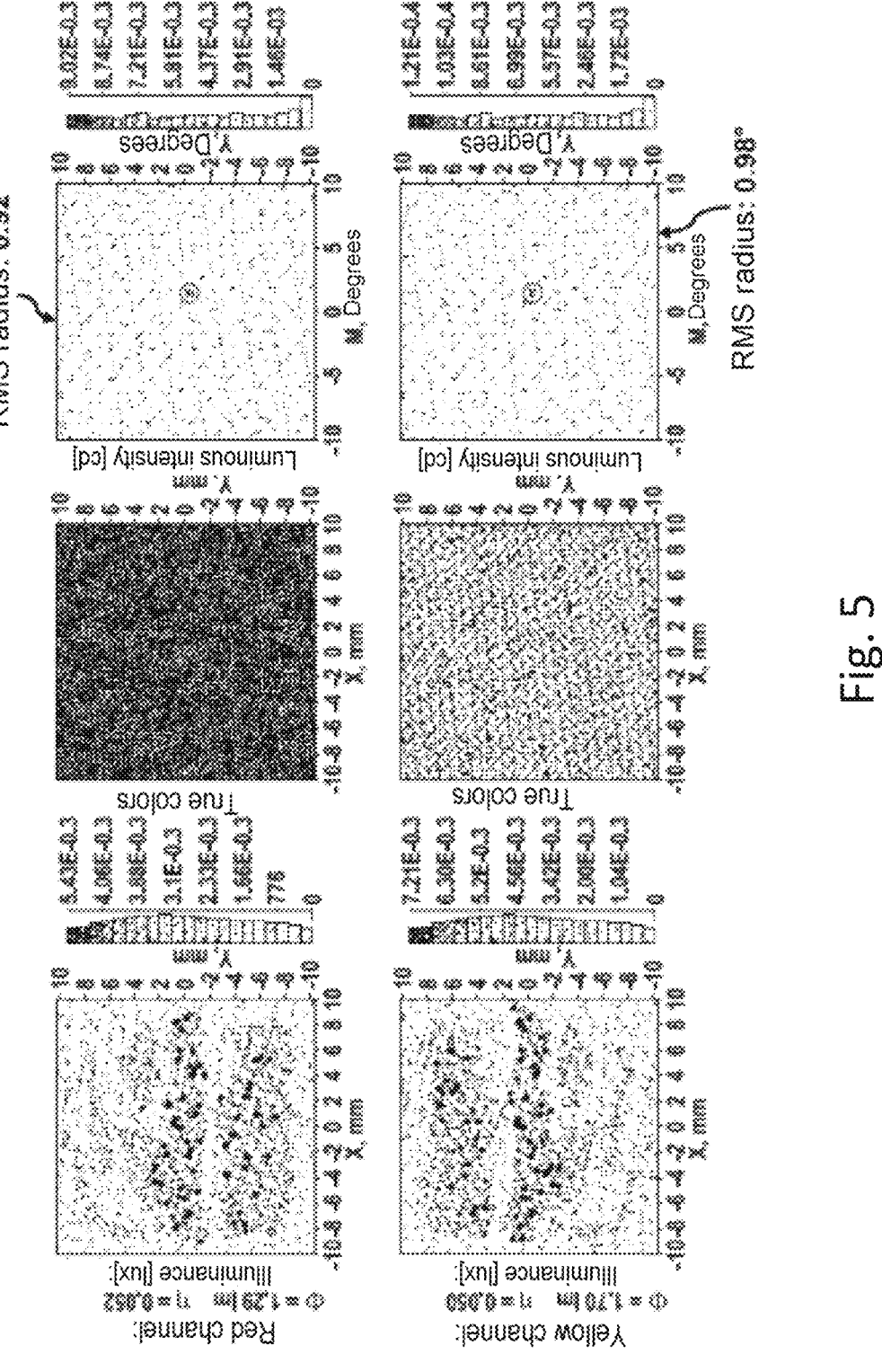
FIG. 5 shows a measurement of various measured variables of the lighting function of both channels of the device according to the first embodiment.

FIG. 5 shows a measurement of various measured variables of the lighting function of both channels of the device according to the first embodiment. In this case, the two channels produce lighting functions in different colors. A first channel produces a holographic display in red and is referred to as the "red channel" according to the drawing. A second channel produces a holographic display in yellow and will henceforth be referred to as the "yellow channel" according to the drawing.

The two lower left and right graphs depict the illuminance in lux (lux, lx) of the "red channel" (bottom left) and the "yellow channel" (bottom right). Lux is preferably the SI unit of illuminance. The lux unit of measurement is preferably defined as the photometric illumination produced by a luminous flux of 1 lumen (lm) when evenly distributed over an area of 1 square meter. The scale above the two graphs preferably allows the graphically represented, different point densities within the graphs to be assigned to a specific value of the illuminance. The degree of homogeneity of the illumination of the output coupling surface can be determined from the representation of the illuminance. Advantageously, $I_{min}/I_{max} > 0.8$, and hence a homogeneous illumination, applies to a large part of the surface. Intensities of 3.88E-0.3 or greater, which are discernible in part, are present only sporadically and do not represent contiguous areas of greater intensity. In large parts, the illuminance is approximately 3.1E-0.3.

The two left and right graphs in the middle are intended to represent the color homogeneity of the channels (here in black and white). In the black and white representation, the high degree of color homogeneity in particular is identifiable here due to the fact that, apart from a few sporadic deviations, a substantially uniform dot pattern with a substantially uniform point density prevails and corresponds to a substantially uniform color of the respective channel, namely red for the "red channel" (left) and yellow for the "yellow channel" (right). The high degree of color homogeneity of the channels is thus advantageously identifiable. This is particularly remarkable since both channels are realized by way of large-area output coupling from the same output coupling surface 9. Consequently, it is advantageously likewise evident how well the channels can be separated from one another.

The two top graphs depict the measured luminous intensity of the "red channel" (left) and the "yellow channel" (right). The luminous intensity preferably indicates the luminous flux related to the solid angle. Its SI unit is the candela (cd). Luminous flux is preferably a photometric variable which indicates the light emitted by a light source per unit of time that is perceivable by the human eye. In addition to the physical (radiometric) radiant flux, it preferably takes into account the sensitivity of the human eye. It is given in the unit lumen (lm). The luminous intensity is preferably defined by $d\phi_V/d\Omega$, where $d\Omega$ preferably describes an infinitesimal solid angle element and $d\phi_V$ the luminous flux component in the solid angle element $d\Omega$. The angle spectrum and the degree of collimation can be determined from the representation of the luminous intensity. A centroid angle and an RMS radius are determined from this data for evaluation. The RMS radius of the left, red channel is 0.92° and the RMS radius of the right, yellow channel is 0.98°. Here, too, the scale above the two graphs allows the graphically represented, different point densities within the graphs to be assigned to a specific value of the luminous flux. The intensity is very low except for in the middle of the graph. No secondary maxima are evident next to the maximum at about 0°. This provides evidence for the optimal beam guidance of the device.

Figure 6:
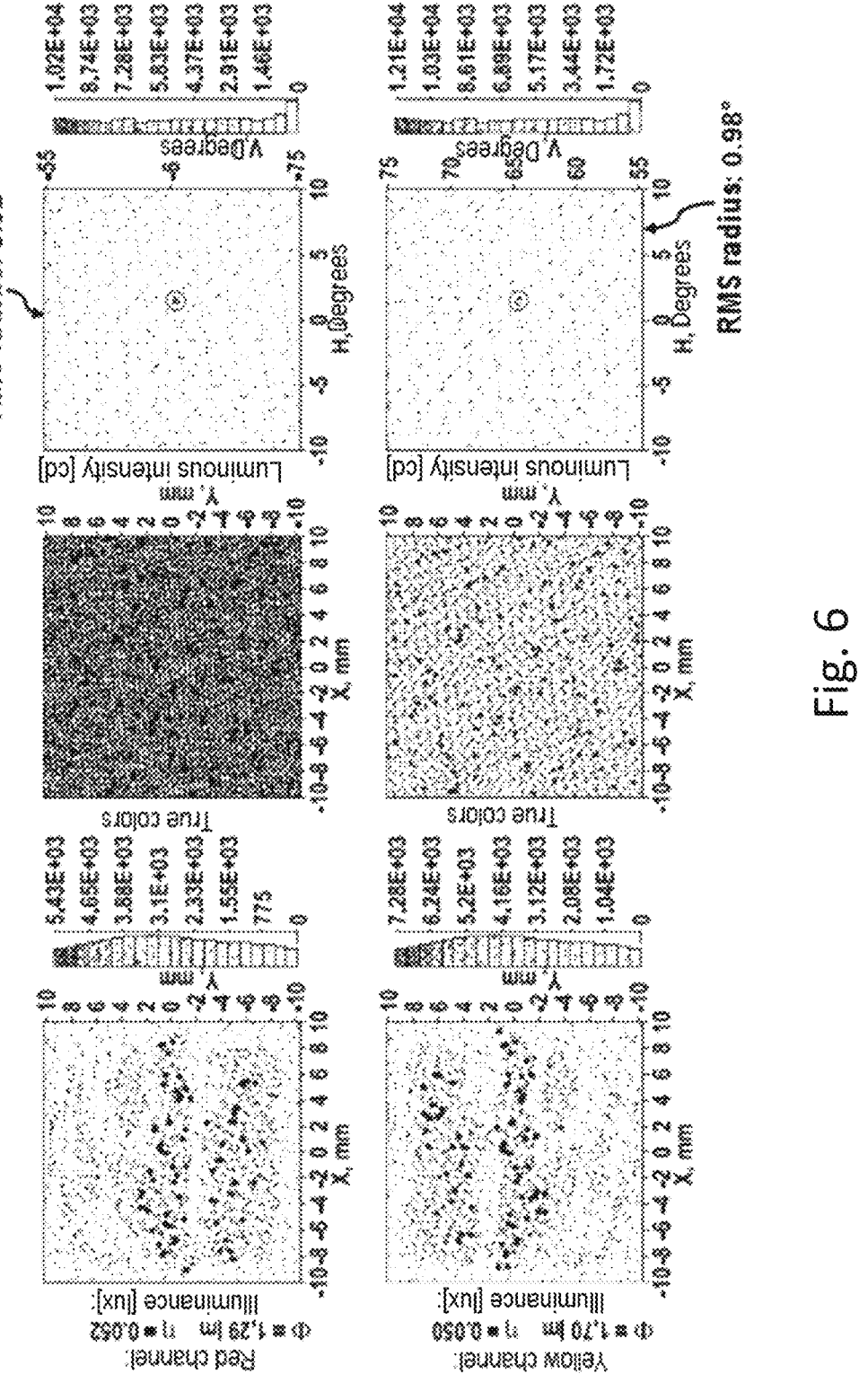
FIG. 6 shows a second measurement of various measured variables of the lighting function of both channels of the device according to the first embodiment.

FIG. 6 shows a second measurement or a simulation of various measured variables of the lighting function of both channels of the device according to the first embodiment. In this case, the two channels produce lighting functions in different colors. A first channel produces a holographic display in red and is referred to as the "red channel" according to the drawing. A second channel produces a holographic display in yellow and will henceforth be referred to as the "yellow channel" according to the drawing.

The two lower left and right graphs depict the illuminance in lux (lux, lx) of the "red channel" (bottom left) and the "yellow channel" (bottom right). Lux is preferably the SI unit of illuminance. The lux unit of measurement is preferably defined as the photometric illumination produced by a luminous flux of 1 lumen (Im) when evenly distributed over an area of 1 square meter. The scale above the two graphs allows the graphically represented, different point densities within the graphs to be assigned to a specific value of the illuminance. The length of the bars depicted there with the different point densities preferably indicates the area or the frequency of the respective measured illuminance values on a logarithmic scale, which has the gradations '1' 53, '10' 55 and '100' 57. The degree of homogeneity of the illumination of the output coupling surface can be determined from the representation of the illuminance. Advantageously, $I_{min}/I_{max} > 0.8$, and hence a homogeneous illumination, applies to a large part of the surface. Intensities of 4.65E+0.3 or greater, which are discernible in part, are present only sporadically and do not represent contiguous areas with significantly deviating intensities. Over large parts of the surface, the illuminance advantageously satisfies the desired homogeneity.

The two left and right graphs in the middle are intended to represent the color homogeneity of the channels (here in black and white). The black and white representation, in particular, renders identifiable that, apart from a few sporadic deviations, a substantially uniform dot pattern with a substantially uniform point density prevails and corresponds to a substantially uniform color of the respective channel, namely red for the "red channel" (left) and yellow for the "yellow channel" (right). The high degree of color homogeneity of the channels is thus advantageously identifiable. This is particularly remarkable since both channels are realized by way of large-area output coupling from the same output coupling surface 9. Consequently, it is advantageously likewise evident how well the channels can be separated from one another.

The two top graphs depict the measured luminous intensity of the "red channel" (left) and the "yellow channel" (right). The luminous intensity preferably indicates the luminous flux related to the solid angle. Its SI unit is the candela (cd). Luminous flux is preferably a photometric variable which indicates the light emitted by a light source per unit of time that is perceivable by the human eye. In addition to the physical (radiometric) radiant flux, it preferably takes into account the sensitivity of the human eye. It is given in the unit lumen (Im). The luminous intensity is preferably defined by $d\phi_V/d\Omega$, where $d\Omega$ preferably describes an infinitesimal solid angle element and $d\phi_V$ the luminous flux component in the solid angle element $d\Omega$. The angle spectrum and the degree of collimation can be determined from the representation of the luminous intensity. A centroid angle and an RMS radius are determined from this data for evaluation. The RMS radius of the left, red channel is 0.92° and the RMS radius of the right, yellow channel is 0.98°. Here, too, the scale above the two graphs allows the graphically represented, different point densities within the graphs to be assigned to a specific value of the luminous flux. The length of the bars depicted there with the different point densities preferably indicates the area or the frequency of the respective measured luminous flux values on a logarithmic scale, which has the gradations '1' 53, '10' 55 and '100' 57. The intensity is very low except for in the middle of the graph. No secondary maxima are evident next to the maximum at about 0°. This provides evidence for the optimal beam guidance of the device.

Figures 7, 8:
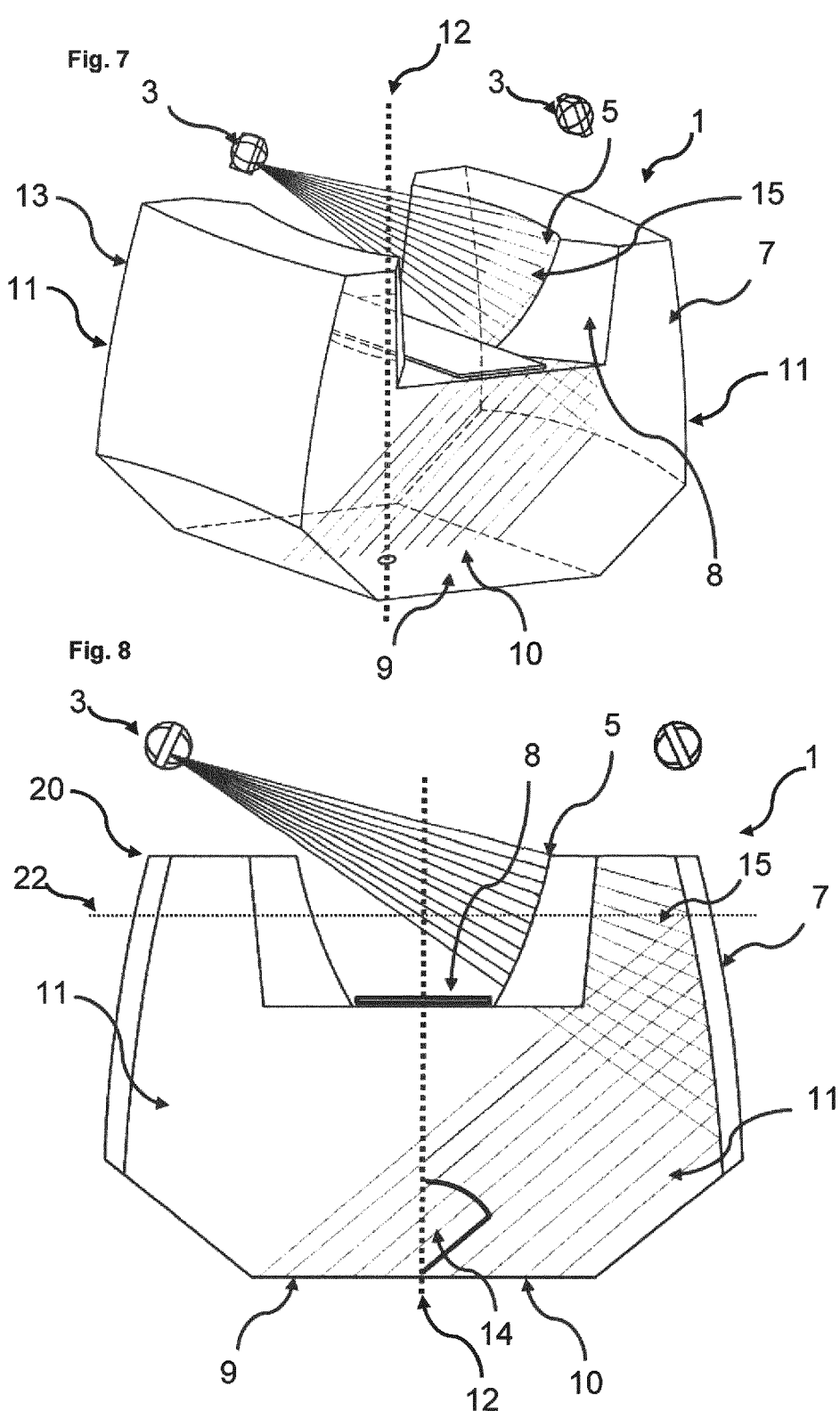

FIG. 7 shows a perspective view of a second embodiment of the device with two channels and light sources 3 which are above the arrangement plane of the input coupling surfaces and arranged along an edge region of the lateral outer surface 20 of the device. Each light source 3 radiates light at an angle of inclination into the input coupling surface 5 assigned thereto. The input-coupled light is subsequently incident on the reflection surface 7. The angle at which the input-coupled light 15 is incident on the reflection surface 7 is greater than in the first embodiment and the light is accordingly also reflected from the reflection surface 7 to the output coupling surface 9, on which the holographic structure 10 is present in this example, at a greater angle. This allows a distance between the input coupling surface 5 and reflection surface 7 to be shorter without interfaces of the monolithic component 13 trimming a substantial part of the input-coupled light beam 15. Thus, the component 13 can be designed to be more compact. At the same time, in this embodiment, the distance between the light source 3 and the input coupling surface 5 assigned thereto can be kept large since the light sources 3 do not impede one another but rather radiate crosswise into the input coupling surfaces 5 assigned thereto. It is identifiable that, in this exemplary embodiment as well, both edge-lit arrangements 11 are present arranged at azimuthal arrangement angles about the surface normal of the input coupling surface 12 that differ by 180°. Consequently, there are also two opposing edge-lit arrangements 11 here, which are arranged in a joint monolithic component 13. A stop 8 to the side of the input coupling surface 5 is likewise shown for this embodiment.

FIG. 8 shows a cross-sectional view of the second embodiment with two channels, with a first channel switched on. The steeper angle of the input-coupled light radiation 15 also becomes clear in this representation and this is reflected by a smaller polar angle 14 with respect to the surface normal of the output coupling surface 12 at which the output coupling surface 9 is illuminated starting from the reflection surface 7. The component 13 can be kept more compact as a result of the more advantageous beam guidance enabled thereby. At the same time, the overall height increases only slightly as a result of arranging the light source 3 above the arrangement plane of the input coupling surface 22 since the vertical distance to the arrangement plane 22 is kept as small as possible while taking into account the beam path emanating from the light source 3. The lateral extent of the device does not increase at all as a result of arranging the light source along the edge region of the lateral outer surface. However, the distance of the light source 3 from the input coupling surface 5 assigned thereto can be significantly increased. This results in very good beam properties overall, which ensure a high optical quality of the lighting function without having a negative effect on the dimensions of the device 1. The polar angle 14 is read positive counterclockwise and is thus $-\Theta$. A stop element 8 is likewise shown for this embodiment and it reduces undesired radiation of the light source 3 into the component 15.

Figures 9, 10:
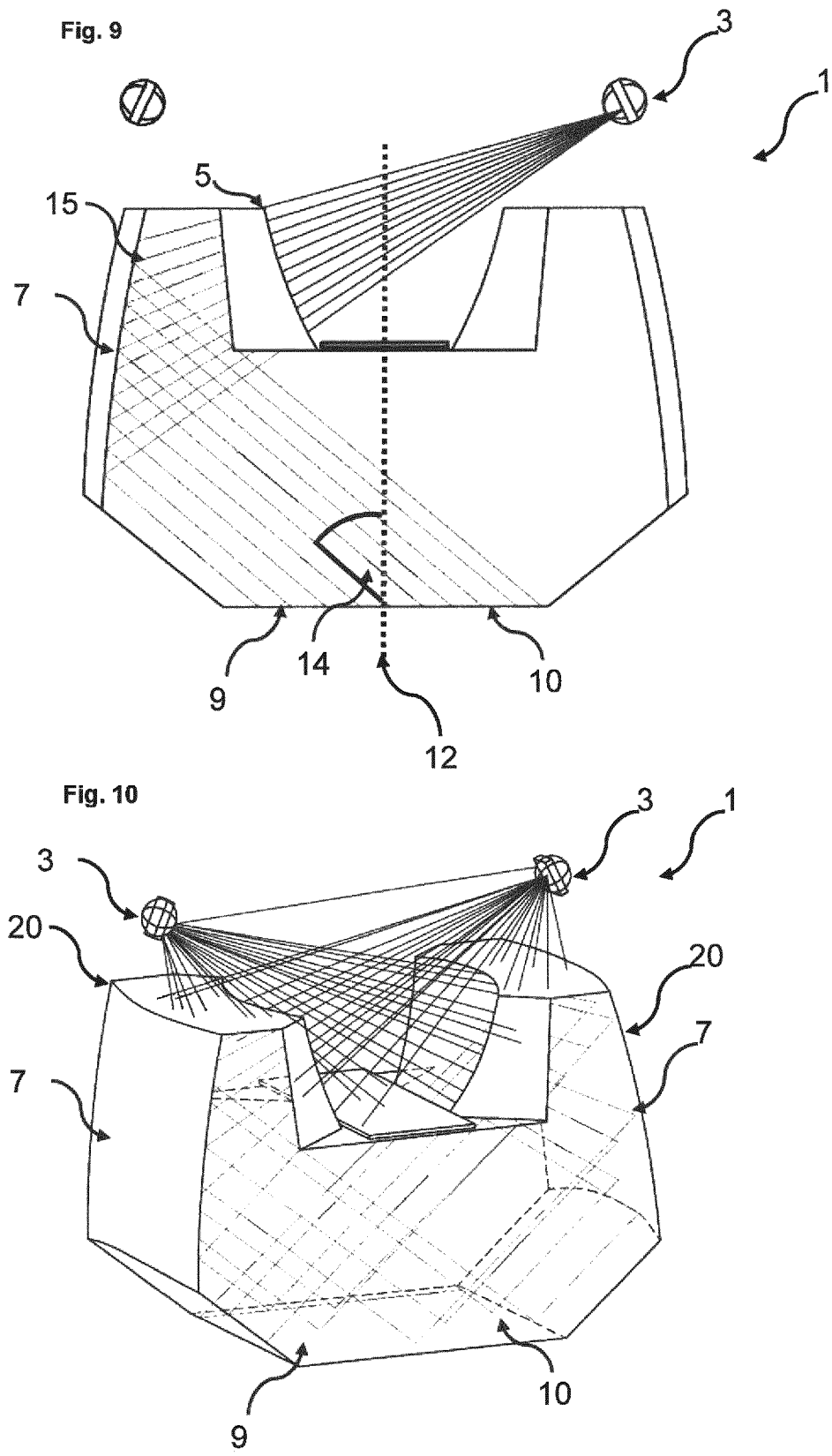

FIG. 9 shows a cross-sectional view of the second embodiment with two channels, with a second channel switched on. The polar angle 14 between the reflective illumination and the surface normal of the output coupling surface 12 is +0.

FIG. 10 shows a second perspective view of the second embodiment of the device 1 with two channels.

Figure 11:
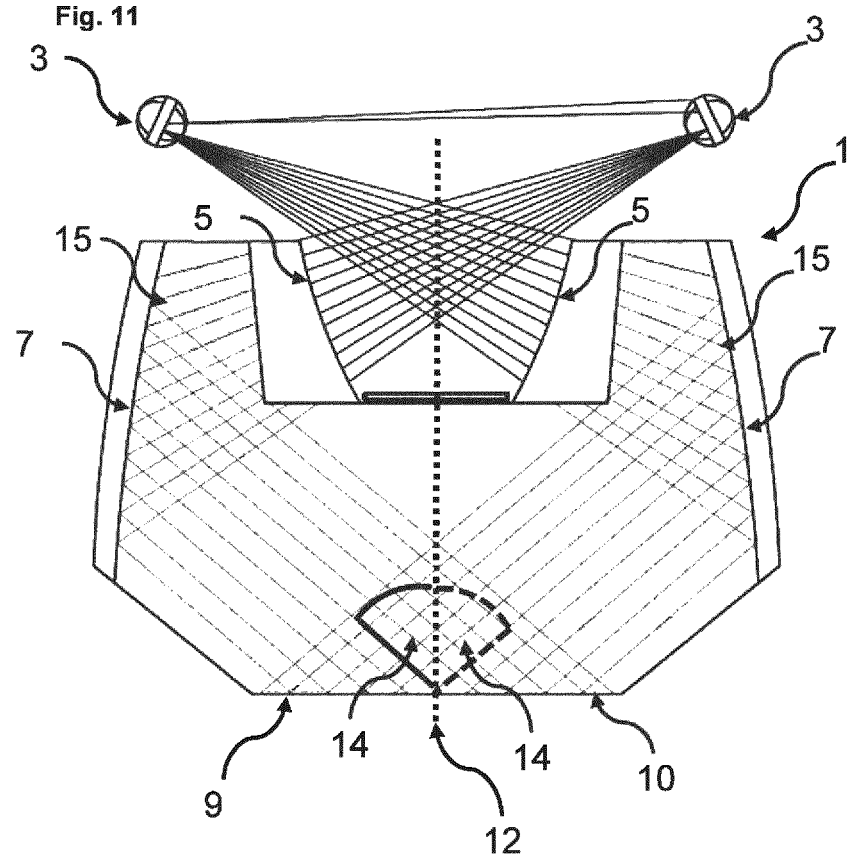

FIG. 11 shows a cross-sectional view of the second embodiment with both channels switched on. The illumination of two opposing channels can be well separated by the respective holographic structures 10 (not shown individually) since the illumination is incident on the output coupling surface 9 at different polar angles 14 of +0 (light from the left channel) and $-\Theta$ (light from the right channel).

Figure 12:
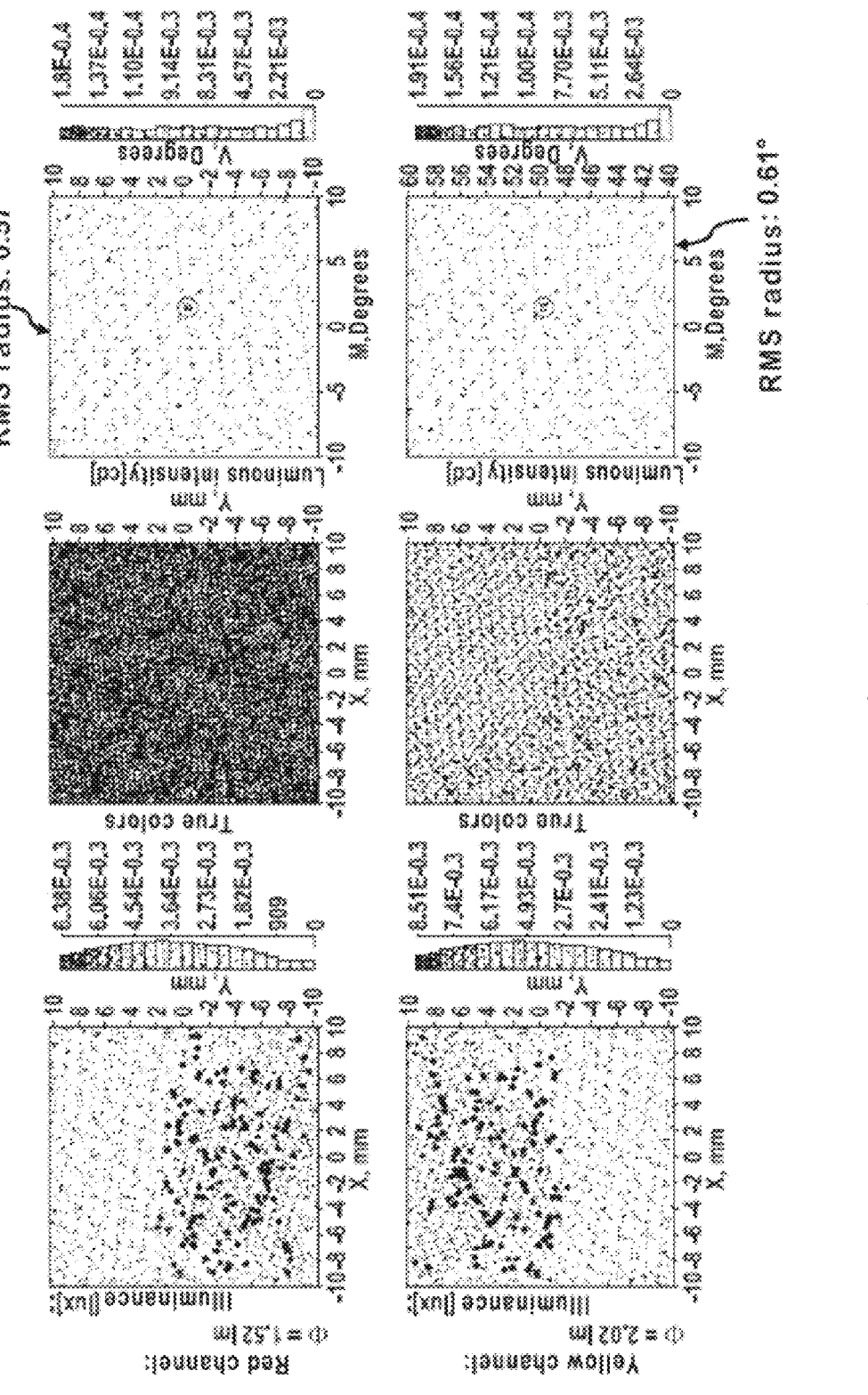
FIG. 12 shows a measurement of various measured variables of the lighting function of both channels of the device according to the second embodiment.

FIG. 12 shows a measurement of various measured variables of the lighting function of both channels of the device according to the second embodiment. The explanations relating to FIGS. 5 and 6, for example in relation to the variables shown in each graph, are also valid here, mutatis mutandis. As above, the two channels produce lighting functions in different colors in this case. A first channel produces a holographic display in red and is referred to as the "red channel" according to the drawing. A second channel produces a holographic display in yellow and will henceforth be referred to as the "yellow channel" according to the drawing.

The two lower left and right graphs depict the illuminance in lux (lux, lx) of the "red channel" (bottom left) and the "yellow channel" (bottom right). Here, the homogeneity of the illumination is advantageously shown to have been improved once again. In large parts (except for at sporadic points), the illuminance values are less than 4.54E-0.3 and are of the order of 3.64E-0.3. In these regions, $I_{min}/I_{max}>0.8$ applies substantially everywhere. A largely homogeneous illumination is thus identifiable. The angle spectrum and the degree of collimation can preferably be determined from the representation. The RMS radius of the left, red channel is 0.57° and the RMS radius of the right, yellow channel is 0.61°. The intensity is very low apart from at the maximum at around 0°, and no secondary maxima are visible. This provides evidence for the optimal beam guidance of this embodiment of the device as well.

The two middle left and right graphs represent the true colors of the channels by way of a corresponding black and white dot pattern. The high degree of color homogeneity of the "red channel" (left) and the "yellow channel" (right) is advantageously identifiable here. This is particularly remarkable since both channels are realized by way of large-area output coupling from the same output coupling surface 9. Consequently, it is preferably likewise evident how well the channels can be separated.

The two top graphs depict the measured luminous intensity of the "red channel" (left) and the "yellow channel" (right). The angle spectrum and the degree of collimation can be determined from the representation. The RMS radius of the left, red channel is 0.57° and the RMS radius of the right, yellow channel is 0.61°. The intensity is very low apart from at the maximum at around 0°, and no secondary maxima are visible. This provides evidence for the optimal beam guidance of this embodiment of the device as well.

Figure 13:
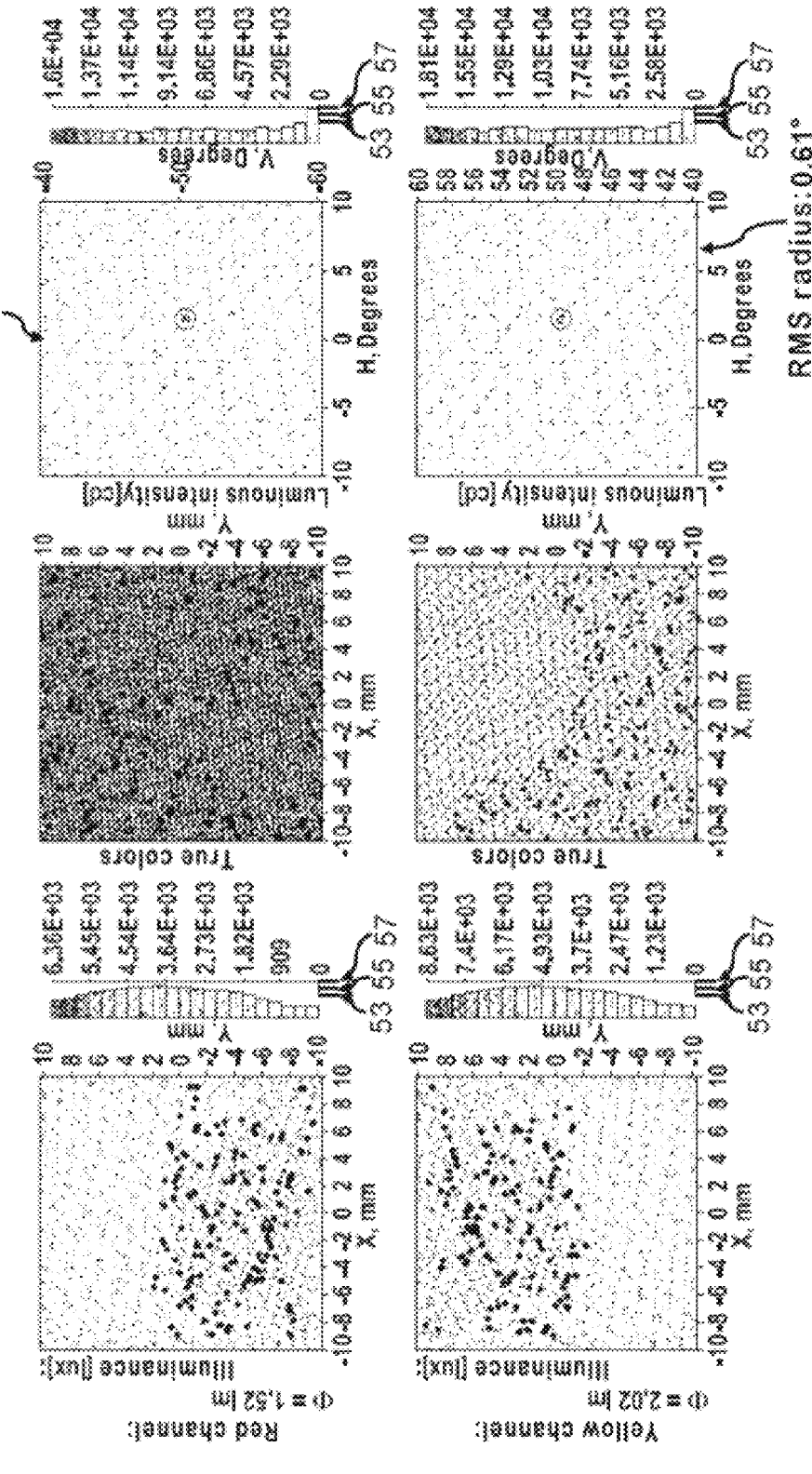
FIG. 13 shows a second measurement of various measured variables of the lighting function of both channels of the device according to the second embodiment.

FIG. 13 shows a second measurement or a simulation of various measured variables of the lighting function of both channels of the device according to the second embodiment. The explanations relating to FIGS. 5 and 6, for example in relation to the variables shown in each graph, are also valid here, mutatis mutandis. As above, the two channels produce lighting functions in different colors in this case. A first channel produces a holographic display in red and is referred to as the "red channel" according to the drawing. A second channel produces a holographic display in yellow and will henceforth be referred to as the "yellow channel" according to the drawing.

The two lower left and right graphs depict the illuminance in lux (lux, lx) of the "red channel" (bottom left) and the "yellow channel" (bottom right). Here, the homogeneity of the illumination is advantageously shown to have been improved once again. In large parts (except for at sporadic points), the illuminance values are no greater than 4.54E+0.3 and advantageously exhibit a high level of homogeneity; in particular, $I_{min}/I_{max}$>0.8 applies substantially everywhere. A largely homogeneous illumination is thus identifiable.

The two middle left and right graphs represent the true colors of the channels by way of a corresponding black and white dot pattern. The high degree of color homogeneity of the "red channel" (left) and the "yellow channel" (right) is advantageously identifiable here. This is particularly remarkable since both channels are realized by way of large-area output coupling from the same output coupling surface 9. Consequently, it is preferably likewise evident how well the channels can be separated.

The two top graphs depict the measured luminous intensity of the "red channel" (left) and the "yellow channel" (right). The angle spectrum and the degree of collimation can be determined from the representation. The RMS radius of the left, red channel is 0.57° and the RMS radius of the right, yellow channel is 0.61°. The intensity is very low apart from at the maximum at around 0°, and no secondary maxima are visible. This provides evidence for the optimal beam guidance of this embodiment of the device as well.

Figures 14, 15:
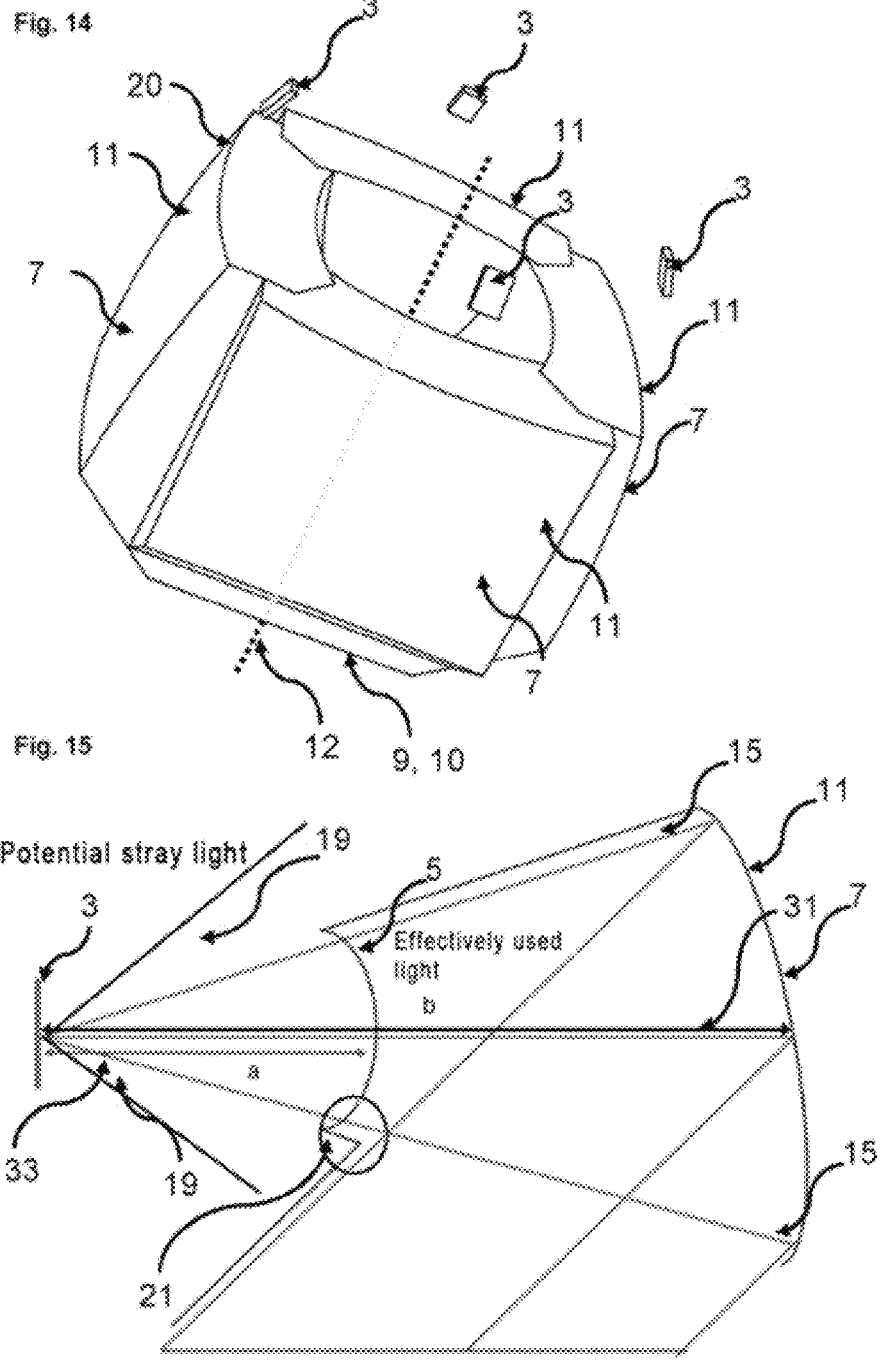
FIG. 14 shows a perspective view of the device according to the second embodiment and four channels.
FIG. 15 elucidates, on the basis of a schematic view, the effect of the distances between the various elements of the arrangement on the beam path.

FIG. 14 shows a perspective view of the device 1 according to the second embodiment and four channels. Here, four edge-lit arrangements are arranged around the surface normal of the output coupling surface 12 in a ring-like arrangement at four azimuthal arrangement angles, each differing by 90°. The respective light sources 3 are arranged equivalently along the edge region of the lateral outer surface 20. There is preferably a first (not shown) and a second (not shown) concentric circle around the surface normal of the output coupling surface 12, with the input coupling surfaces 5 being touched by the first circle at a single point and the reflection surfaces 7 being touched by the second circle at a single point. The light sources 3 are likewise preferably arranged along a third concentric circle.

FIG. 15 elucidates, on the basis of a schematic view, the effect of the distances between the various elements of the arrangement on the beam path. The angle spectrum of the light source 18 which is coupled into the edge-lit arrangement 11 can be reduced vis-à-vis a smaller distance by way of the chosen distance 33 between the light source 3 and input coupling surface 5. The distance 31 is important for the angle spectrum of the illumination of the output coupling surface 9 because, in the exemplary embodiment shown, the reflection surface 7 is essential for collecting the light and collimating the beams. The interfaces of the component to the outside are preferably matched to the beam path of the input-coupled light 15, and so unwanted total-internal reflections of the input-coupled light 15 can be prevented. In the exemplary embodiment shown, a distance 31 between the light source 3 and reflection surface 7 is preferably dimensioned in such a way that a collimation of the beams reflected in the direction of the output coupling surface can be achieved. As described, a rather large distance tends to be preferred for this purpose, which advantageously means that the light source 3 for the reflection surface 7 can be approximated as a point light source. The distance 33 is then preferably chosen so that the difference between the distance 31 and the distance 33 is minimized without trimming the beams, for example at the cutting edge 21. In addition to collimating the beams, other types of beam shaping may also be preferred. Potential cutting edges 21 for the light beams are preferably also considered during shaping and are advantageously minimized.

Figures 16, 17:
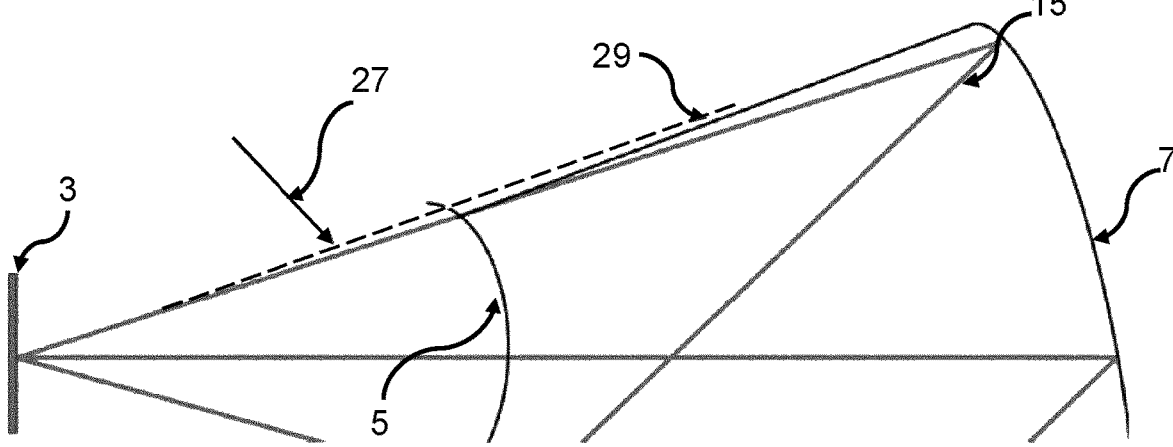
FIG. 16 schematically shows an embodiment of the device with a rounding at an outer edge of the input coupling surface.
FIG. 17 schematically shows an embodiment of the device with a tilted connecting surface between the input coupling surface and reflection surface.

FIG. 16 schematically shows an embodiment of the device 1 with a rounding 23 at an outer edge of the input coupling surface 5. Since the input coupling surface 5 and reflection surface 7 have a distance from one another, the upper side or (top) connecting surface 29 between the input coupling surface 5 and the reflection surface 7 also has a finite extent d, at which rays can be subject to total-internal reflection 35. Rounded areas 23 can preferably be introduced on the outer edges of the input coupling surface 5 in order to shade the aforementioned rays or scatter them in a targeted manner. In this way, light rays near the limit of the input-couplable angle spectrum 27, which could cause such undesired total-internal reflections, can be scattered or diffracted in unproblematic directions in a targeted manner.

FIG. 17 schematically shows an embodiment of the device with a tilted connecting surface 29 between the input coupling surface 5 and reflection surface 7.

This represents an alternative way of preventing undesired total-internal reflections that could be caused by light rays near the limit of the input-couplable angle spectrum 27. The connecting surface 29 is tilted "upward" from the input coupling surface 5 in such a way that it is likewise not possible for unwanted reflections to occur.

Figure 18:
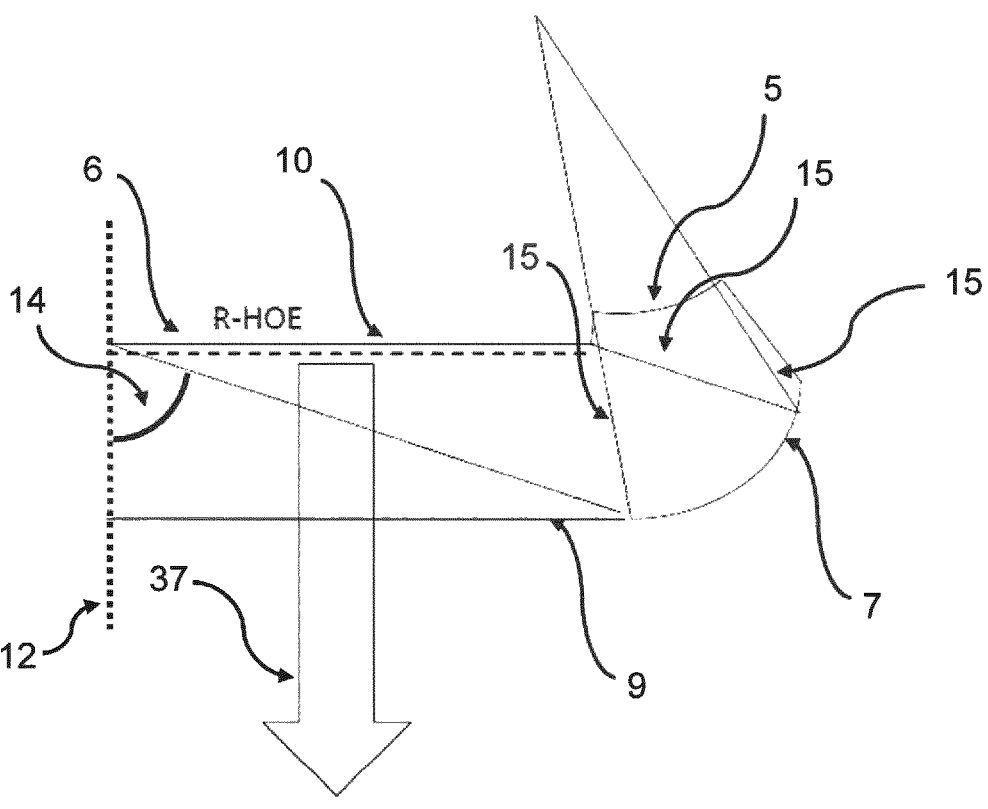
FIG. 18 schematically shows an embodiment with a reflective holographic structure, which is arranged not on the output coupling surface but rather on a surface parallel thereto and opposite the output coupling surface.

While the previously shown drawings show exemplary embodiments with transmissive holographic structures present on the output coupling surface, FIG. 18 schematically shows an embodiment with a reflective holographic structure 10 arranged not on the output coupling surface 9 but on a surface 6 which is parallel thereto and opposite to the output coupling surface 9. It is possible to identify that this embodiment is also illuminated at a polar angle 14 measured between the surface normal of the output coupling surface 12 and the direction of the illumination beams. The light 37 diffracted by the holographic structure in the direction of the output coupling surface 9 is output-coupled by the latter. It is possible to identify that, for this example, the incoming radiation direction of the light into the input coupling surface 5 is steeper and the reflection surface 7 is arranged differently, so that the input-coupled light 15 is reflected in the direction of the holographic structure and not the output coupling surface 9.

Figure 19:
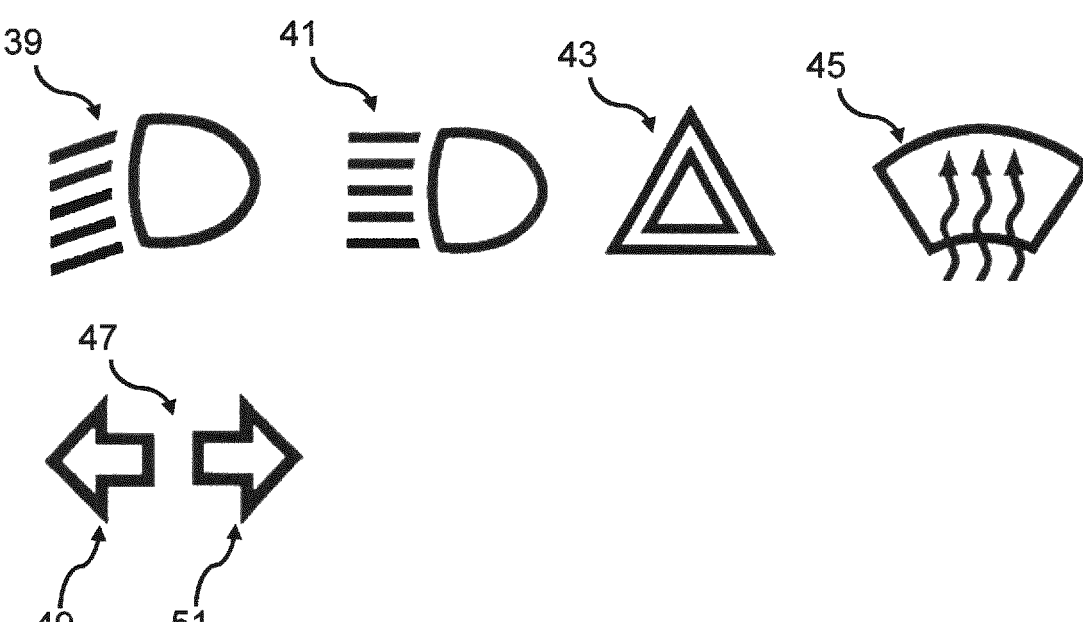
FIG. 19 shows possible displayed elements when using the holographic lighting device to display at least one of a plurality of possible information items for an operating element in a vehicle.

FIG. 19 shows possible displayed elements when using the holographic lighting device to display at least one of a plurality of possible information items for an operating element in a vehicle. In this case, for example, a display element can be realized which outputs information about various states of the vehicle or component parts of the vehicle. Examples are the displays shown and elements indicated here in accordance with 78/316/EEC, for example a low beam indicator 39, a high beam indicator 41, a hazard warning lights indicator 43, a windshield demisting and defrosting system indicator 45, and/or a turn signal indicator 47. The displays can each be displayed by a respective dedicated lighting device or by a single lighting device, as the case may be. In this case, it may also be possible for a plurality of elements to be shown at the same time, for example by virtue of these being displayed on the output coupling surface in spatially separate regions. In the case of the turn signal, a lighting device can be used specifically to indicate whether the left turn signal (left turn signal indicator 49) or the right turn signal (right turn signal indicator 51) was actuated. The display can have holographic 3-D effects or appear two-dimensional as standard.

The above examples preferably relate to single color displays. However, it may likewise be preferable for certain displays that the display changes color depending on the status, for example from red (displayed function is switched off) to green (displayed function is switched on). This is then likewise advantageously implementable by a single lighting device as described herein.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Holographic lighting device
3 Light source
5 Input coupling surface
6 Surface parallel or opposite to the output coupling surface
7 Reflection surface
8 Stop element
9 Output coupling surface
10 Holographic Structure
11 Edge-lit arrangement
12 Surface normal of the output coupling surface
13 Monolithic component
14 Polar angle
15 Input-coupled light beams
16 Channel arrangement direction
17 Partly open inner region
18 Azimuthal arrangement angle
19 Angle spectrum of the light source
20 Edge region of the lateral outer surface
21 Cutting edge for light beam
22 Arrangement plane of the input coupling surfaces
23 Rounded area
25 Distance between the input coupling surface and reflection surface
27 Light rays near the limit of the input-couplable angle spectrum
29 (Offset) connecting surface between the input coupling surface and reflection surface
31 Distance between the light source and reflection surface
33 Distance between the light source and input coupling surface
35 Undesirable reflection at a connecting surface between the input coupling surface and reflection surface
37 Light beams for producing the lighting function
39 Low beam indicator
41 High beam indicator
43 Hazard warning lights indicator
45 Windshield demisting and defrosting system indicator 47 Turn signal indicator
49 Left turn signal indicator
51 Right turn signal indicator
53 Scale label with value '1'
55 Scale label with value '10'
57 Scale label with value '100'

The invention claimed is:

1. A holographic lighting device for producing at least two holographic lighting functions, comprising:
   at least two channels, wherein each of the at least two channels is assigned to a respective one of the at least two holographic lighting functions
   wherein each of the at least two channels comprises:
       an edge-lit arrangement, comprising:
           an input coupling surface for coupling light from a light source into the edge-lit arrangement; and
           an output coupling surface,
           wherein the light source is arranged to radiate into the input coupling surface,
   wherein the edge-lit arrangements of the at least two channels are encompassed in a monolithic component,
   wherein the output coupling surface is a joint output coupling surface,
   wherein each of the at least two channels is arranged about a surface normal to the output coupling surface along an azimuthal arrangement angle,
   wherein the monolithic component includes at least one holographic structure predominantly parallel to the output coupling surface and configured to produce the lighting function of the respective at least two channels under illumination by the light source,
   wherein the output coupling surface includes the at least one holographic structure, and
   wherein the light source and edge-lit arrangement are configured for illumination of the output coupling surface at a polar angle greater than a critical angle of total-internal reflection.

2. The holographic lighting device of claim 1, wherein the edge-lit arrangement of each of the at least two channels includes a reflection surface which is configured for direct reflective illumination of the holographic structure with input- coupled light.

3. The holographic lighting device of claim 2, wherein the reflection surface is configured to direct reflective illumination of the holographic structure along the azimuthal arrangement angle, and wherein the holographic structure is configured to produce the lighting function of the at least two channels in the case of the reflective illumination along the azimuthal arrangement angle.

4. The holographic lighting device of claim 2,
   wherein the reflection surfaces are arranged to at least partly form at least one lateral outer surface of the monolithic component,
   wherein the input coupling surfaces are arranged in the direction of an interior of the monolithic component, and
   wherein the input coupling surfaces are arranged to laterally enclose a partly open inner region of the monolithic component in at least one region.

5. The holographic lighting device of claim 2, wherein the reflection surface comprises a parabolic mirror, the focal plane of which coincides with an emitter surface of the light source, and wherein the emitter surface of the light source has an extent of up to $1\times1$ mm$^2$ and the light source and the assigned reflection surface have a distance of at least 20 mm.

6. The holographic lighting device of claim 1, wherein the reflection surface is configured for direct reflective illumination of the at least one holographic structure by input-coupled light at a polar angle, and wherein the at least one holographic structure is configured to produce the lighting function in the case of an illumination at the polar angle.

7. The holographic lighting device of claim 1, wherein the at least one holographic structure is configured to produce the lighting function of the channel in the case of an illumination with a spectral range corresponding to the light source of the channel.

8. The holographic lighting device of claim 1,
   wherein the at least one holographic structure is a transmissive holographic structure.

9. The holographic lighting device of claim 1, wherein a surface parallel to the output coupling surface includes the at least one holographic structure, wherein the at least one holographic structure is a reflective holographic structure.

10. The holographic lighting device of claim 1, wherein the at least two channels have an azimuthal deviation of at least 1° from one another from an opposing arrangement in relation to the surface normal of the output coupling surface.

11. The holographic lighting device of claim 1, wherein the at least two channels have a deviation of between 1° and 10° from one another by an absolute value of the polar angle.

12. The holographic lighting device of claim 1, wherein the light source is arranged on a same side of the surface normal to the output coupling surface as the input coupling surface assigned thereto in the inner region of the monolithic component.

13. The holographic lighting device of claim 1, wherein the light source is arranged on an opposite side of the surface normal to the output coupling surface as the input coupling surface assigned thereto outside of the inner region of the monolithic component along an edge region of the lateral outer surface of the monolithic component.

14. The holographic lighting device of claim 1, wherein the light source is arranged above an arrangement plane of the input coupling surfaces which is perpendicular to the surface normal to the output coupling surface, and configured for radiating into the input coupling surface assigned thereto at an angle with respect to the arrangement plane of the input coupling surfaces.

15. The holographic lighting device of claim 1, wherein the holographic structure is configured to produce an identical image for each channel, and wherein the lighting function corresponds to an adjustable brightness of the image.

16. The holographic lighting device of claim 1, wherein the holographic structure is configured for a beam shaping of light beams of the channel, and wherein the beam shaping is selected from the group consisting of collimation, focusing and/or divergence.

17. A vehicle, comprising:
   at least one holographic lighting device, comprising:
      at least two channels, wherein each of the at least two channels is assigned to a respective one of the at least two holographic lighting functions
      wherein each of the at least two channels comprises:
         an edge-lit arrangement, comprising:
            an input coupling surface for coupling light from a light source into the edge-lit arrangement; and
            an output coupling surface,
            wherein the light source is arranged to radiate into the input coupling surface,
      wherein the edge-lit arrangements of the at least two channels are encompassed in a monolithic component, wherein the output coupling surface is a joint output coupling surface,
      wherein each of the at least two channels is arranged about a surface normal to the output coupling surface along an azimuthal arrangement angle, and
      wherein the monolithic component includes at least one holographic structure predominantly parallel to the output coupling surface and configured to produce the lighting function of the respective at least two channels under illumination by the light source,
   wherein the holographic lighting device is configured to display at least one of a plurality of possible information items relating to a driving situation,
   wherein one information item is assigned to a channel of the holographic lighting device,
   wherein the holographic lighting device is arranged in an A pillar, a B pillar and/or a C pillar of the vehicle, and
   wherein the holographic lighting device comprises a display of a lane change assist system.

18. A method of using a holographic lighting device, comprising:
   providing a holographic lighting device, comprising:
      at least two channels, wherein each of the at least two channels is assigned to a respective one of the at least two holographic lighting functions
      wherein each of the at least two channels comprises:
         an edge-lit arrangement, comprising:
            an input coupling surface for coupling light from a light source into the edge-lit arrangement; and
            an output coupling surface,
            wherein the light source is arranged to radiate into the input coupling surface,
      wherein the edge-lit arrangements of the at least two channels are encompassed in a monolithic component,
      wherein the output coupling surface is a joint output coupling surface,
      wherein each of the at least two channels is arranged about a surface normal to the output coupling surface along an azimuthal arrangement angle, and
      wherein the monolithic component includes at least one holographic structure predominantly parallel to the output coupling surface and configured to produce the lighting function of the respective at least two channels under illumination by the light source,
   displaying via the holographic lighting device at least one of a plurality of possible information items in a vehicle relating to a driving situation,
   wherein the at least one of a plurality of possible information items is assigned to a channel of the holographic lighting device; and
   wherein, for the purpose of displaying the information, the holographic structure is illuminated by the light source assigned to the channel.

19. The method of claim 18, wherein the holographic lighting device comprises an LED collimator.

20. A holographic lighting device for producing at least two holographic lighting functions, comprising:
   at least two channels, wherein each of the at least two channels is assigned to a respective one of the at least two holographic lighting functions
   wherein each of the at least two channels comprises:
      an edge-lit arrangement, comprising:
         an input coupling surface for coupling light from a light source into the edge-lit arrangement; and
         an output coupling surface, wherein the light source is arranged to radiate into the input coupling surface, wherein the edge-lit arrangements of the at least two channels are encompassed in a monolithic component, wherein the output coupling surface is a joint output coupling surface, wherein each of the at least two channels is arranged about a surface normal to the output coupling surface along an azimuthal arrangement angle, wherein the monolithic component includes at least one holographic structure predominantly parallel to the output coupling surface and configured to produce the lighting function of the respective at least two channels under illumination by the light source, wherein the edge-lit arrangement of each of the at least two channels includes a reflection surface which is configured for direct reflective illumination of the holographic structure with input-coupled light, wherein the reflection surfaces are arranged to at least partly form at least one lateral outer surface of the monolithic component, wherein the input coupling surfaces are arranged in the direction of an interior of the monolithic component, and wherein the input coupling surfaces are arranged to laterally enclose a partly open inner region of the monolithic component in at least one region.

21. A holographic lighting device for producing at least two holographic lighting functions, comprising:

at least two channels, wherein each of the at least two channels is assigned to a respective one of the at least two holographic lighting functions wherein each of the at least two channels comprises:

an edge-lit arrangement, comprising:

an input coupling surface for coupling light from a light source into the edge-lit arrangement; and an output coupling surface, wherein the light source is arranged to radiate into the input coupling surface, wherein the edge-lit arrangements of the at least two channels are encompassed in a monolithic component, wherein the output coupling surface is a joint output coupling surface, wherein each of the at least two channels is arranged about a surface normal to the output coupling surface along an azimuthal arrangement angle, wherein the monolithic component includes at least one holographic structure predominantly parallel to the output coupling surface and configured to produce the lighting function of the respective at least two channels under illumination by the light source, wherein the edge-lit arrangement of each of the at least two channels includes a reflection surface which is configured for direct reflective illumination of the holographic structure with input-coupled light, wherein the reflection surface comprises a parabolic mirror, the focal plane of which coincides with an emitter surface of the light source, and wherein the emitter surface of the light source has an extent of up to $1 \times 1$ mm$^2$ and the light source and the assigned reflection surface have a distance of at least 20 mm.

* * * * *